US009439166B2

(12) United States Patent
Siomina et al.

(10) Patent No.: US 9,439,166 B2
(45) Date of Patent: Sep. 6, 2016

(54) TECHNIQUE FOR ADAPTING AN RF RECEIVER CONFIGURATION

(71) Applicant: Telefonaktiebolaget L M Ericsson (publ), Stockholm (SE)

(72) Inventors: Iana Siomina, Solna (SE); Alireza Nejatian, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/431,856

(22) PCT Filed: Oct. 1, 2013

(86) PCT No.: PCT/EP2013/070451
§ 371 (c)(1),
(2) Date: Mar. 27, 2015

(87) PCT Pub. No.: WO2014/053488
PCT Pub. Date: Apr. 10, 2014

(65) Prior Publication Data
US 2015/0257118 A1 Sep. 10, 2015

Related U.S. Application Data
(60) Provisional application No. 61/708,177, filed on Oct. 1, 2012.

(51) Int. Cl.
*H04W 64/00* (2009.01)
*H04W 24/10* (2009.01)
(Continued)

(52) U.S. Cl.
CPC ............. *H04W 64/00* (2013.01); *G01S 5/021* (2013.01); *H04B 17/0085* (2013.01);
(Continued)

(58) Field of Classification Search
CPC .. H04W 64/00; H04W 24/10; H04B 17/309; H04B 17/21; H04B 17/24; H04B 17/0085; H04B 17/29; G01S 5/021
USPC .......................................... 455/456.1–456.6
See application file for complete search history.

(56) References Cited

U.S. PATENT DOCUMENTS

| 7,720,469 B2 * | 5/2010 | Kerstenbeck ............. H03L 1/02 370/257 |
| 2005/0070307 A1 * | 3/2005 | Charbonnier ......... H04W 48/18 455/456.3 |

(Continued)

FOREIGN PATENT DOCUMENTS

WO 2012012561 A1 1/2012

OTHER PUBLICATIONS

3GPP, "3rd Generation Partnership Project; Technical Specification Group GSM/EDGE Radio Access Network; Radio transmission and reception (Release 10)", 3GPP TS 45.005 V10.6.0, Aug. 2012, 1-252.

(Continued)

*Primary Examiner* — Brandon Miller
(74) *Attorney, Agent, or Firm* — Murphy, Bilak & Homiller, PLLC

(57) ABSTRACT

A technique for operating a radio network node having at least one radio frequency receiver for receiving signals according to a wireless communication standard is described. A method implementation of the technique comprises providing RF receiver capabilities of the radio network node by transmitting a report message comprising report information. The report information pertains to a current RF receiver configuration with one or more current RF characteristics or possible RF receiver configurations with a range of one or more possible RF characteristic. The method also comprises receiving a control message comprising control information, wherein the control information pertain to a control of the current RF receiver configuration. The RF receiver configuration is then adapted based on the control information.

25 Claims, 8 Drawing Sheets

(51) Int. Cl.
    *H04B 17/00* (2015.01)
    *G01S 5/02* (2010.01)
    *H04B 17/24* (2015.01)
    *H04B 17/21* (2015.01)
    *H04B 17/309* (2015.01)
    *H04B 17/29* (2015.01)

(52) U.S. Cl.
    CPC ............. *H04B 17/21* (2015.01); *H04B 17/24* (2015.01); *H04B 17/309* (2015.01); *H04W 24/10* (2013.01); *H04B 17/29* (2015.01)

(56) References Cited

U.S. PATENT DOCUMENTS

| | | | |
|---|---|---|---|
| 2005/0221764 A1 | 10/2005 | Shen et al. | |
| 2008/0232308 A1 | 9/2008 | Dehner et al. | |
| 2011/0053518 A1* | 3/2011 | Shindo | H04B 17/0085 455/67.14 |
| 2011/0237199 A1 | 9/2011 | Venkataraman et al. | |
| 2012/0164950 A1* | 6/2012 | Nentwig | H04W 28/18 455/63.1 |
| 2014/0080506 A1* | 3/2014 | Siomina | H04W 64/00 455/456.1 |
| 2014/0106774 A1* | 4/2014 | Siomina | H04W 64/00 455/456.1 |

OTHER PUBLICATIONS

3GPP, "3rd Generation Partnership Project; Technical Specification Group Radio Access Network; Base Station (BS) radio transmission and reception (FDD) (Release 10)", 3GPP TS 25.104 V10.7.0, Sep. 2012, 1-94.

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.0.0, Sep. 2012, 1-106.

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.7.0, Sep. 2012, 1-126.

3GPP, "3rd Generation Partnership Project; Technical Specification Group Radio Access Network; Evolved Universal Terrestrial Radio Access (E-UTRA); Physical layer; Measurements (Release 11)", 3GPP TS 36.214 V11.0.0, Sep. 2012, 1-14.

3GPP, "3rd Generation Partnership Project; Technical Specification Group Radio Access Network; Location Measurement Unit (LMU) performance specification; User Equipment (UE) positioning in UTRAN (Release 11)", 3GPP TS 25.111 V11.0.0, Sep. 2012, 1-17.

3GPP, "3rd Generation Partnership Project; Technical Specification Group Radio Access Network; Physical layer; Measurements (FDD) (Release 11)", 3GPP TS 25.215 V11.0.0, Dec. 2011, 1-24.

* cited by examiner

TECHNIQUE FOR ADAPTING AN RF RECEIVER CONFIGURATION

TECHNICAL FIELD

The present disclosure generally relates to wireless communications. In particular, a technique is presented for adapting a Radio Frequency (RF) configuration for an RF receiver of a radio network node. In certain examples, the receiver may be used for at least one of a positioning measurement and a timing measurement. The technique may be implemented in the form of one or more network nodes, a network system, a method, and a computer program product.

BACKGROUND

Positioning and other measurements are important features of modern wireless communication networks. In the exemplary case of an emergency call from a mobile phone, the position of the mobile phone may need to be determined via a positioning measurement when the calling person is not capable of providing the corresponding information. Other measurement examples pertain to Radio Resource Management (RRM) and interference estimation.

Positioning measurements in wireless communication networks are often based on timing measurements. In this regard, TDOA-based positioning approaches can be mentioned. TDOA is an abbreviation for Time Difference of Arrival and exploits timing information obtained from multiple RF receivers to calculate the position, or location, of a wireless device in communication with those receivers.

Positioning approaches based TDOA and similar techniques have advantages over positioning approaches that rely on Global Navigation Satellite Systems (GNSSs), such as the Global Positioning System (GPS) or GALILEO. First, the latter approaches require that the wireless device is actually equipped with a GNSS receiver, which might not be the case for certain classes of wireless devices (e.g., legacy phones). Moreover, the GNSS receiver, when present, also has to be in an active state. Since GNSS receivers have a considerable power consumption users often prefer to deactivate them unless specifically needed (e.g., for route guidance purposes). Still further, GNSS receivers require a clear "view" of multiple satellites for deriving a correct position. This condition is typically not fulfilled when a wireless device is operated indoors or in urban environments (i.e., when being surrounded by tall buildings). As such, positioning approaches that rely on the infrastructure of a wireless communication network are often the only possibility to detect the location of a wireless device.

Positioning and other measurements are typically performed by a network node having one or multiple RF receivers. Each RF receiver is operated with a certain RF receiver configuration. The RF receiver configuration may be defined by one or more RF characteristics, such as receiver sensitivity. Evidently, the current RF receiver configuration has influence on the performance of the RF receiver, including its measurement performance.

SUMMARY

There is a need for a technique that permits an efficient adaptation of an RF receiver configuration in connection with measurements and other operations performed by an RF receiver.

According to a first aspect, a radio network node having at least one RF receiver for receiving signals according to a wireless communication standard is provided. The radio network node comprises a transmitter interface configured to transmit a report message comprising report information, wherein the report information pertains to a current RF receiver configuration with one or more current RF characteristics or possible RF receiver configurations with a range of one or more possible RF characteristics. The radio network node further comprises a receiver interface configured to receive a control message comprising control information, wherein the control information pertains to a control of the current RF receiver configuration. Still further, the radio network node comprises a configuration controller configured to adapt the RF receiver configuration based on the control information.

The radio network node may be configured to provide the report information upon a request. The request may be received from another network node. Alternatively, or in addition, the radio network node may be configured to issue a request asking for the control information. In such a case the control message may be received responsive to the request. In certain configuration, the report message transmitted by the radio network node may constitute the request asking for the control information.

The control information may control the current RF receiver configuration in various ways. As an example, the current RF receiver configuration may be controlled by specifying an RF receiver configuration to be set or one or more performance targets (including thresholds and rules) for the one or more RF characteristics of the current RF receiver configuration.

The radio network node may be a measuring node, such as a Location Measurement Unit (LMU). The measuring node may be configured to perform radio measurements, using the adapted RF receiver configuration, based on signals transmitted by a wireless device. In one variant, the measuring node is configured for at least one of positioning and timing measurements. Such measurements may comprise TDOA and similar measurements.

The report message may configure one or more radio measurements to be performed by another network node. The other network node may be another measuring node (e.g., another LMU).

The radio network node may be further configured to select one or more other nodes, in particular other radio network nodes, for performing radio measurements. Additionally, or as an alternative, the radio network node may be a self-adaptive node with autonomous RF receiver configuration adaption.

The control information may pertain to an RF receiver configuration of another node, in particular another radio network node. The radio network node may adaptively configure its radio equipment to the RF receiver configuration of the other network node. That RF receiver configuration of the other network node may be received via a report message comprising report information. In one variant, the radio network node and the other network node are peers in a network system. (e.g., a measuring node system)

The report information may request, indicate or adapt various parameters. Such parameters comprise one or more of a need of configuring or re-configuring radio equipment (e.g., one or more RF receivers) of another network node (in particular another radio network node), a desired RF performance target, a receiver RF type of the other network node, and a configuration of the other network node to meet certain pre-defined requirements.

The radio network node may be a test equipment node or a system simulator, or may be attachable to such a test equipment node or system simulator. The attachment may be performed via one or more receiver or antenna ports of the radio network node.

The RF characteristics may comprise one or more parameters. Such parameters may include one or more of a receiver sensitivity, a receiver dynamic range, a receiver in-band selectivity, a receiver adjacent channel sensitivity, a receiver blocking as in-band band or out-of-band, a narrow band blocking characteristics receiver spurious emissions, and a receiver intra-modulation characteristic.

The configuration controller may be further configured to adapt the RF receiver configuration also based on at least one of interference estimation and noise estimation at the at least one RF receiver. In such a case, the adaptation may be based on both the control information and at least one of an interference estimate and a noise estimate.

Also provided is a network node for controlling adaptation of an RF receiver configuration of a further network node. The network node is configured to receive a report message comprise report information, wherein the report information pertains to a current RF receiver configuration with one or more current RF characteristics or possible RF receiver configurations with a range of one or more possible RF characteristics regarding the further network node. The network node is further configured to transmit a control message comprising control information, wherein the control information pertains to a control of the current RF receiver configuration of the further network node.

The network node may be configured to receive a measurement report from the further network node. The measurement report comprises one or more radio measurements performed by the further network node with an RF receiver configuration that has been adapted based on the control information. In one realization, the measurement report is received from a wireless device. In such an implementation, the wireless device may also send the report message and receive the control message as explained above.

The report information may be analysed by the network node and the control information may be generated responsive to this analysis. The analysis may generally be performed in connection with one or more network management tasks.

The control information may pertain to a network management task. The network management task, in turn, may pertain to the configuration of one or more radio measurements by the further network node. Alternatively, or in addition, the network management task may pertain to selecting one or more further network nodes for performing radio measurements. The radio measurements may pertain to at least one of positioning and timing measurements.

The network management task may pertain to one or more alternative or additional tasks. Such alternative or additional tasks include one or more of selecting or re-selecting a positioning method, radio resource management, mobility, interference coordination, performance testing and verification, collecting of performance statistics, requesting or indicating the need of radio equipment re-configuration for the further network node, indicating a desired RF performance target for the further network node, and ordering the further network node to perform an additional measurement or to re-do one or more measurements with a certain receiver RF type.

Also provided is a network system comprising the radio network node and the further network node presented herein. The network system may take the form of a measuring node system.

According to another aspect, a method of operating a radio network node having at least one RF receiver for receiving signals according to a wireless communication standard is provided. The method comprises transmitting a report message comprising report information, wherein the report information pertains to a current RF receiver configuration with one or more current RF characteristics of possible RF receiver configurations with a range of one or more possible RF characteristics. The method further comprises receiving a control message comprising a control information, wherein the control information pertains to a control of the current RF receiver configuration, and adapting the RF receiver configuration based on the control information.

According to a still further aspect, a method of operating a network node for controlling adaptation of an RF receiver configuration of a further network node is provided. The method comprises receiving a report message comprising report information, wherein the report information pertains to a current RF receiver configuration with one or more current RF characteristics or possible RF receiver configurations with a range of one or more possible RF characteristics regarding the further network node. The method also comprises transmitting a control messages comprising control information, wherein the control information pertains to a control of the current RF receiver configuration of the further network node.

Also provided is a computer program product comprising program code portions for performing the steps of any of the methods presented herein when the computer program product is executed by at least one computing device. The at least one computing device executing the computer program product may be realized by a network node or network node system.

The computer program product may be stored on a computer-readable recording medium, such as a CD-ROM, DVD or semiconductor memory. The computer program product may also be provided for download via a wired or wireless network connection.

BRIEF DESCRIPTION OF THE DRAWINGS

Further aspects, advantages and details of the technique presented herein will be discussed in more detail with reference to exemplary embodiments and the drawings, wherein.

DETAILED DESCRIPTION

Figure 1:
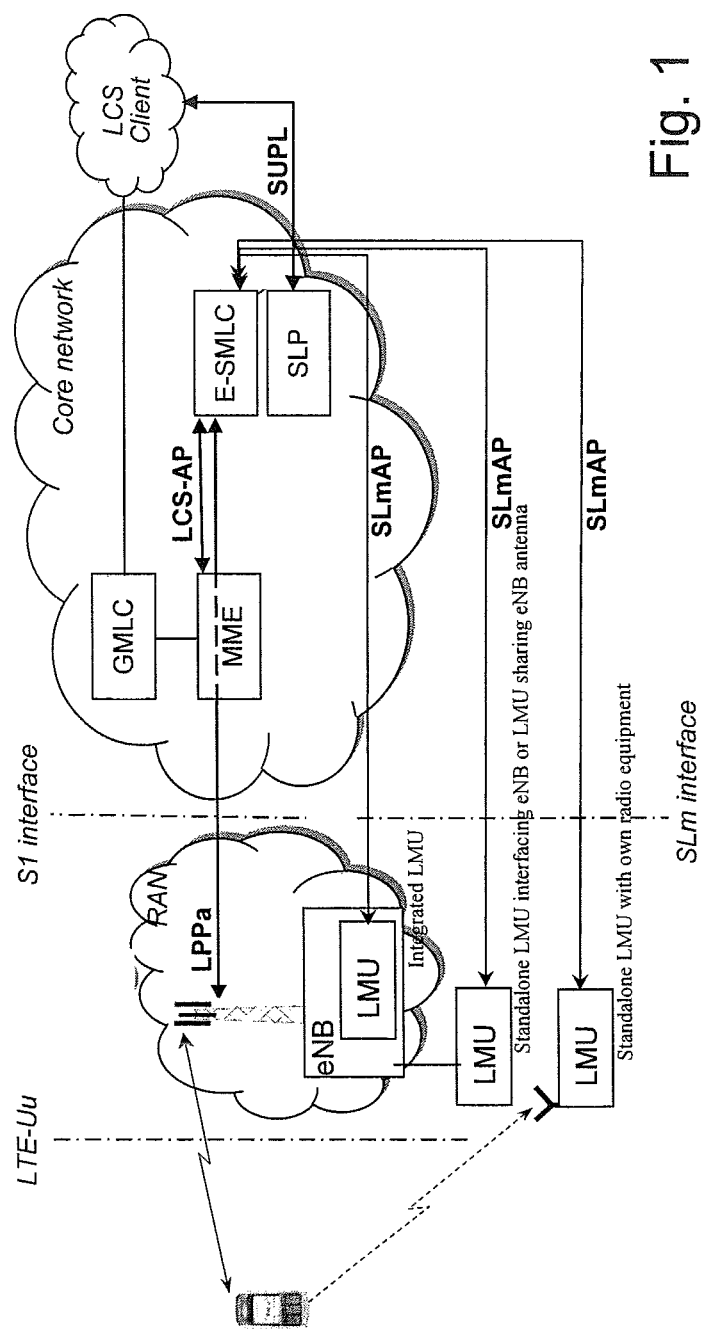
FIG. 1 illustrates an embodiment of a measuring node system in accordance with an embodiment of the present disclosure.

In the following description of exemplary embodiments, for purposes of explanation and not limitation, specific details are set forth, such as specific sequences of signalling steps and specific node embodiments in order to provide a thorough understanding of the technique presented herein. It will be apparent to one skilled in the art that the technique may also be practised in other embodiments that depart from these specific details. For example, while the following embodiments will primarily be described with reference to LTE and LMUs, it will be appreciated that the technique presented herein is not limited to those examples.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in the context of methods and devices, the technique presented herein may also be embodied in a computer program product as well as in a system comprising a computer processor and a memory coupled to the processor, wherein the memory is encoded with one or more programs that may perform the services, functions and steps disclosed herein.

The present disclosure relates to wireless communication networks and in particular to the networks exercising positioning based on measurements performed on radio signals. Some of the described embodiments, however, are not limited to positioning and may be applied also for other services and nodes, e.g., general-purpose radio base stations such as eNodeBs. The abbreviations used hereinafter, when not immediately defined upon their first appearance, are defined at the end of this detailed description.

In the following, some general explanations will be given in connection with radio requirements and positioning, that underlie or complement at least some of the solutions and embodiments of the present disclosure. The terms "embodiment" and "solution" are used interchangeably herein.

Radio Requirements

User Equipments (UEs) as well as base stations (BSs) have to fulfill a specified set of RF transmitter and RF receiver requirements to ensure that the wireless devices limit interference and are able to handle a certain level of interference respectively.

More specifically, the out of band (OOB) and spurious emission requirements are to be met as part of the RF transmitter requirements. The objective of OOB and spurious emission requirements is to limit the interference caused by the transmitters (UE or BS) outside their respective operating bandwidths to the adjacent carriers or bands. In fact, all wireless communication standards (e.g. GSM, UTRAN, E-UTRAN, WLAN etc.) clearly specify the OOB and spurious emission requirements to limit or at least minimize the unwanted emissions. They are primarily approved and set by the national and international regulatory bodies (e.g., ITU-R, FCC, ARIB, ETSI etc.).

The major unwanted emission requirements, which are typically specified by the standardization bodies and eventually enforced by the regulators in different countries and regions for both UE and the base stations comprise:

Adjacent Channel Leakage Ratio (ACLR)
Spectrum Emission Mask (SEM)
Spurious emissions
In-band unwanted emissions The specific definition and the specified level of these requirements can vary from one system to another. Typically these requirements ensure that the emission levels outside an operating bandwidth or band in some cases remain several tens of dB below compared to the wanted signal in the operating bandwidth. Although OOB and spurious emission level tends to decay dramatically further away from an operating band they are not completely eliminated at least in the adjacent carrier frequencies.

The major RF receiver requirements, which are typically specified by the standards bodies and in some cases enforced by the regulators in different countries and regions for both UE and the base stations comprise of:

Receiver sensitivity
Adjacent Channel Selectively (ACS)
In-channel selectivity
Spurious emissions
Blocking: in-band, out-of-band, narrow-band etc.
Performance Metrics for Receiver RF Characteristics in 3GPP In LTE, an LMU node is a radio network node which receives SRS transmitted in UL by UE and performs UL RTOA measurements on the received signals for UTDOA positioning. For ensuring a proper RF performance of LMU receivers, the corresponding receiver requirements and test cases have to be developed and specified. The receiver characteristic under test is then verified based on the comparison of the achieved performance with a reference metric for each requirement.

In LTE, there are currently no RF requirements for LMUs or for LTE UL positioning in general.

GSM

In RF requirements for GSM base stations [3GPP TS 45.005, v10.6.0], frame erasure rate (FER; defined as the ratio of frames erased to frames sampled), bit error rate (BER; defined as the ratio of erroneously received bits to all received bits), or residual bit error rate (RBER; defined as the ratio of erroneously received bits to all bits after frame erasure) are used as performance metrics in the relevant receiver RF requirements.

The same performance metrics are used also for LMU receivers which perform TOA measurements on UL traffic channels.

UTRA

In RF requirements for UTRA radio base stations [3GPP TS 25.104, v10.7.0] and UTRA LMUs [3GPP TS 25.111, v11.0.0], the performance metric is typically Bit Error Ratio (BER). According to the requirements, the BER shall not exceed a specific value corresponding to the RF receiver characteristic under test, e.g., 0.001.

In UTRA, using the BER metric in RF requirements for UL positioning is reasonable since the measurements are performed on a data channel (12.2 kbps, e.g., voice, reference measurement channel is used in requirements).

LTE

In receiver RF evaluations for LTE radio base stations, a common reference performance metric is the maximum throughput for a specified reference measurement channel. In a typical receiver RF requirement example, at least X % (e.g., 95%) of the maximum throughput of the reference measurement channel shall be achieved in specific conditions corresponding to the RF receiver characteristic under test.

The throughput metric, which is used for LTE BSs, is not relevant for LTE LMUs since LTE UL positioning measurements are performed on pilot signals (more precisely, on SRS) which do not comprise any higher-layer information and hence cannot be characterized by a throughput metric.
Positioning Since some embodiments also apply for positioning, the relevant background for positioning is also provided. The possibility to determine the position of a mobile device has enabled application developers and wireless network operators to provide location based, and location aware, services. Examples of those are guiding systems, shopping assistance, friend finder, presence services, community and communication services and other information services giving the mobile user information about their surroundings.

In addition to the commercial services, the governments in several countries have put requirements on the network operators to be able to determine the position of an emergency call. For instance, the governmental requirements in the USA (FCC E911) define that it must be possible to determine the position of a certain percentage of all emergency calls. The requirements make no difference between indoor and outdoor environments.

In many environments, the position can be accurately estimated by using positioning methods based on Global Positioning System (GPS). However, GPS-based positioning may often have unsatisfactory performance (e.g., in urban and/or indoor environments). Complementary positioning methods could thus be provided by a wireless network. In addition to UE-based GNSS (including GPS), the following methods are available in the LTE standard for both the control plane and the user plane, Cell ID (CID)—a basic positioning method exploiting one or more cell IDs, E-CID, including network-based AoA—these methods, including AECID, exploit various measurements, DL and/or UL, such as UE Rx-Tx time difference, eNodeB Rx-Tx time difference, LTE RSRP or RSRQ, HSPA CPICH measurements, AoA, etc. for determining UE position, A-GNSS (including A-GPS)—methods exploiting timing measurements performed on satellite signals, Observed Time Difference of Arrival (OTDOA)—is a method using timing measurements (e.g., RSTD in LTE) performed by UE on DL radio signals transmitted, e.g., by different eNodeBs, for determining the UE position, UL Time Difference of Arrival (UTDOA)—being currently standardized—is a method using timing measurements (e.g., UL RTOA in LTE) performed, e.g., by eNodeBs or LMUs, on UL radio signals transmitted by a UE for determining the UE position.

Positioning Architecture in LTE

The three key network elements in an LTE positioning architecture are the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in a network node, external node, PSAP, UE, radio base station, etc., and they may also reside in the LCS targets themselves. An LCS Client (e.g., an external LCS Client) sends a request to LCS Server (e.g., positioning node) to obtain location information, and LCS Server processes and serves the received requests and sends the positioning result and optionally a velocity estimate to the LCS Client.

Position calculation can be conducted, for example, by a positioning server (e.g. E-SMLC or SLP in LTE) or UE. The latter corresponds to the UE-based positioning node, whilst the former may be network-based positioning (calculation in a network node based on measurements collected from network nodes such as LMUs or eNodeBs), UE-assisted positioning (calculation is in a positioning network node based on measurements received from UE), LMU-assisted (calculation is in a positioning network node based on measurements received from LMUs), etc.

FIG. 1 illustrates the UTDOA architecture being currently discussed in 3GPP. The technique presented herein may be practiced in connection with the architecture illustrated in FIG. 1 and, optionally, for LMU receiver configurations as shown in FIGS. 2 and 3

Figure 2:
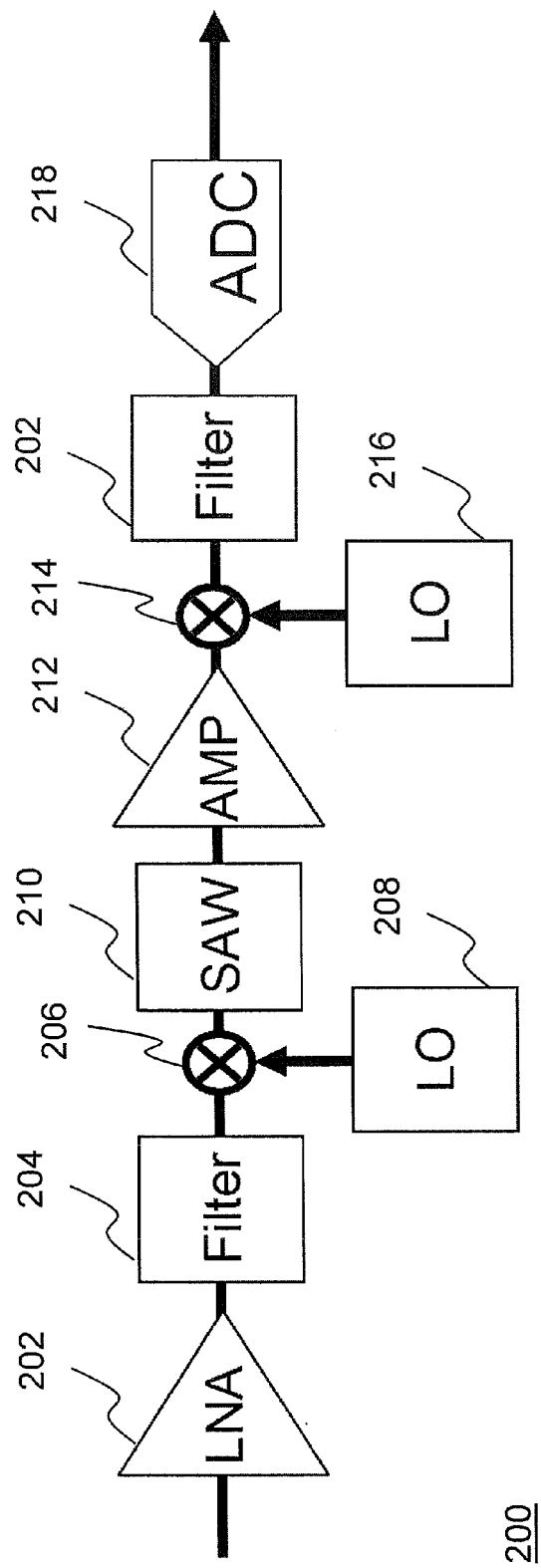
FIG. 2 illustrates a receiver front-end architecture according to an embodiment of the present disclosure.

As illustrated in FIG. 2, an exemplary receiver 200 comprises an LNA 202, followed by a filter 204 and a mixer 206 that also receives a signal from a first local oscillator 208. Downstream of the mixer 206 an SAW filter 210 is provided followed by an amplifier 212. The amplifier 212 is followed by a further mixer 214 that receives a further signal from a second local oscillator 216. Downstream of the mixer 214 a another filter 218 as well as an ADC 220 are provided.

Figure 3:
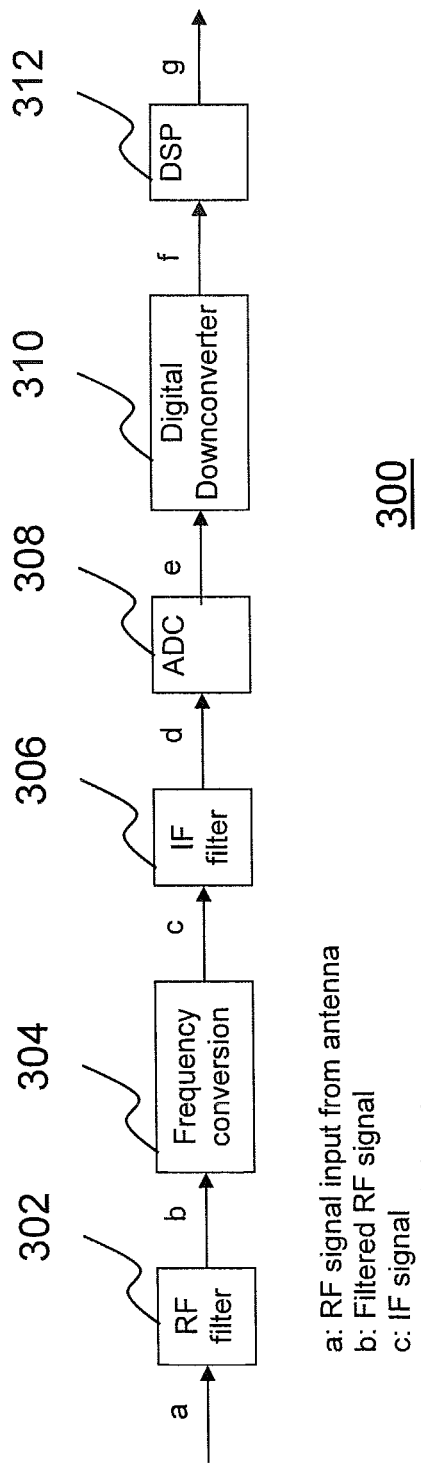
FIG. 3 illustrates an embodiment of a receiver architecture with a digital signal processor in accordance with an embodiment of the present disclosure.

The receiver 300 of FIG. 3 comprises an RF filter 302 followed by a frequency conversion stage 304 and an Intermediate Frequency (IF) filter. Downstream of the IF filter 306 an ADC 308 as well as a digital down converter 310 are provided. The digital down converter 310 is followed by a DSP 312 configured to generate a measurement report. The measurement report may be generated by the DSP 312 responsive to a measurement request. That measurement request may be received from a test equipment node (not shown in FIG. 3). Based on measurement reports generated by the DSP 312, the RF performance metric estimates discussed herein may be generated by the test equipment node.

Although UL measurements may in principle be performed by any radio network node (e.g., eNodeB), UL positioning architecture may include specific UL measurement units (e.g., LMUs) which e.g. may be logical and/or physical nodes, may be integrated with radio base stations or sharing some of the software or hardware equipment with radio base stations or may be completely standalone nodes with own equipment (including antennas). The architecture is not finalized yet, but there may be communication protocols between LMU and positioning node, and there may be some enhancements for LPPa or similar protocols to support UL positioning. A new interface, SLm, between the E-SMLC and LMU is being standardized for uplink positioning. The interface is terminated between a positioning server (E-SMLC) and LMU. It is used to transport SLmAP protocol (new protocol being specified for UL positioning) messages over the E-SMLC-to-LMU interface. Several LMU deployment options are possible. For example, an LMU may be a standalone physical node, it may be integrated into eNodeB or it may be sharing at least some equipment such as antennas with eNodeB—these three options are illustrated in the FIG. 1.

LPPa is a protocol between eNodeB and LCS Server specified only for control-plane positioning procedures, although it still can assist user-plane positioning by querying eNodeBs for information and eNodeB measurements. LPPa may be used for DL positioning and UL positioning.

In LTE, UTDOA measurements, UL RTOA, are performed on Sounding Reference Signals (SRS). To detect an SRS signal, LMU needs a number of SRS parameters to generate the SRS sequence which is to be correlated to received signals. The SRS parameters used for generating the SRS sequence and determining when SRS transmissions occur may be provided in the assistance data transmitted by positioning node to LMU; these assistance data would be provided via SLmAP. However, these parameters may generally be not known to the positioning node, which needs then to obtain this information from eNodeB configuring the SRS to be transmitted by the UE and measured by LMU; this information would have to be provided in LPPa by eNodeB to E-SMLC.

It has been found that there are currently limited means in the standard for supporting the RF configuration information exchange and consequently there are no methods of using this information. This is also due to the fact that the receiver RF architectures have been by recent totally dependent on hardware and thus allowing no flexibility and not calling for the need to support the RF receiver flexibility. Also, there is no any requirement between different embodiments in an eNB besides Rx diversity, UL MIMO. Moreover, there is no any flexibility of usage of receivers characteristics.

This leads to some drawbacks. There are currently no methods for controlling or testing receiver performance for UL positioning measurements, especially when the receiving node is not a radio base station or when the measurements are performed on physical radio signals that do not contain any higher-layer information (unlike, e.g., data channels). Moreover, there are currently no methods of adapting receiver RF configuration for positioning measurements There are currently no methods for adapting receiver RF configuration interactively with another node. In the prior art, no noise estimation or total interference plus noise estimation is done by LMUs, neither it is used for receiver RF configuration adaptation. There are currently no signaling means for exchanging the RF configuration information between two nodes.

In one general aspect these drawbacks are solved by a node of a radio network, having one or more RF receivers for receiving signals according to a wireless communication standard. The node provides its RF receiver capabilities in a message comprising RF type information.

In one variant the node adapts its RF receiver capabilities based on a received message comprising RF type information.

The RF receiver capabilities may be determined by a RF receiver configuration having certain RF characteristics.

The RF type information in the message send by the node may report a current RF receiver configuration with current RF characteristics or the possible RF receiver configurations with the range of RF characteristics.

The node may provide the reported RF type information either unsolicited or after receiving a request to report them.

The RF type information in the received message may control the current RF receiver configuration by either specifying the RF receiver configuration to be set or the performance targets for the RF characteristics of the current RF receiver configuration.

The node may issue a request asking for the controlling RF type information.

The above aspects can be used in several embodiments, which may be implemented as independent embodiments or combined in different ways. Some example embodiments are as follows:
  Methods in a first node of obtaining and using receiver RF type information.
  Methods of adapting the receiver RF type of the measuring node (not limited to positioning) based on the interaction with the first node.
  Methods of adapting the receiver RF type of the measuring node for positioning.
  Methods of estimating RF performance for positioning and/or timing measurements.

The embodiments above may also be used in their different combinations with each other.

The methods above do not require a certain architecture and/or deployment type of the measuring node (e.g., co-siting, co-location, LMU integrated/sharing/standalone, etc.), although in some embodiments the specifics of the architecture or deployment may be exploited to obtain additional performance benefits.

At least one or more of the following advantages, or other advantages, are envisioned:
  New signaling means for exchanging the RF configuration information, not limited to positioning
  Enabling adaptive RF configuration for positioning, valid for all measuring nodes
  The solution is architecture-transparent and facilitates self-adaptive nodes' behavior, e.g., with autonomous RF configuration adaptation.

Solution 1

Methods in a First Node of Obtaining and Using Receiver RF Type Information Associated with the Second Node Embodiment, or solution, 1 may be a standalone solution or may be combined with one or more of the other solutions described herein. Further, even though in some examples, embodiments of solution 1 are combined with embodiment, or solution 2, these embodiments of the solution 1 may also be used with any radio node with the capability of adaptively configuring its receiver RF type, i.e., not necessarily limited to the positioning purpose; the adaptation in this case may be performed according to generalized (without restricting to positioning purpose) embodiments from solution 2. The adaptive configuration may follow a pre-defined rule, in some embodiments.

According to a basic embodiment in this part of the present disclosure, a first node obtains the information about the receiver RF type of a second node and uses it for one or more radio node and/or radio network management tasks. In one specific example, the radio network management task is associated with positioning in general or a specific positioning method (e.g., UTDOA or UL positioning; OTDOA or DL positioning) or service (e.g., emergency positioning, high-data rate service) or a specific radio node type (e.g., LMU or eNodeB).

Some examples of radio node and radio network management tasks are:
  Configuring one or more radio measurements (e.g., positioning UL RTOA measurements, mobility measurements, RF measurements, etc.) to be performed by the second node, where, in one example, one or more measurement configuration parameters may be selected adaptively to the receiver RF type, Selecting one or more of second nodes for performing radio measurements, e.g.,
  selecting and/or configuring for measurements a set of cooperating/assisting LMUs for performing UL positioning measurements for one or more of target wireless devices, or selecting a set of radio nodes for CoMP, or selecting a set of transmit/receive antennas in a DAS, selecting a set of RRUs or RRHs,
(Re)selecting positioning method (e.g., selecting a different positioning method for a target wireless device when the RF type of the available receivers comprised in one or more second nodes does not meet a certain criterion or a requirement),
RRM and mobility (e.g., adapting a power control configuration or cell selection/re-selection parameters for a wireless device adaptively to the receiver RF type of the second node),
interference coordination (e.g., controlling the interfering transmissions from other radio nodes to enable or to facilitate measurement at the receiver of the second node, adaptively to the receiver RF type of the second node),
performance testing and verification of the second node's performance (e.g., a set of specific pre-defined rules or requirements to be verified may be selected adaptively to the receiver RF type or a set of pre-defined radio environment conditions are configured adaptively to the receiver RF type),
collecting network or node performance statistics in a database,
MDT, SON, or O&M,
Configuring a radio equipment of the first node adaptively to the receiver RF type of the second node (e.g., when the equipment is shared by the first and the second node or the second node is integrated into the first node)
Requesting or indicating the need of (re)configuring radio equipment of the second node or indicating a desired RF performance target
  The indication may also comprise a specific requested configuration or an indication of a rule or a condition based on which the configuration may be selected
  The measuring node may also be (implicitly or explicitly) requested to re-do the measurements with the new receiver RF type or perform a certain measurement with the new receiver type
  The second node may be requested to change the receiver RF type after a certain time or event, for a period of time, for a specific service only, for serving a specific wireless device, for a specific measurement or measurement type,
  According to some embodiments of solution 1 and these generalized embodiments of solution 2, the adaptation of the receiver RF type of the second node may be performed interactively with the first node; the adaptation may also follow a pre-defined rule or steps or may select among pre-defined configurations during the adaptation; the interaction may be in a form of an instruction or a recommendation from the first node, which may also be organized in a closed or open loop procedure, i.e., with or without feedback comprising RF configuration and/or RF performance related information from the second node. Thus, not only the second node may adapt its configuration, but also the first node adapts it or participates in the adaptation;
Ordering the second node to perform additional measurement or re-do one or more measurements with certain receiver RF type via e.g. comparison of the measurement with a normal case if the results shows some unexpected behavior and/or worse than desired/expected performance.
Transmitter scheduling configuration of one or more of: the second node, the first node, or a third radio node (e.g., some RF configurations may allow for more efficient frequency hopping or frequency diversity),
Receiver scheduling configuration of one or more of: the second node, the first node, or a third radio node (e.g., some RF configurations may allow for more efficient frequency hopping or frequency diversity),
Power or energy consumption control of the first node.

The second node is a measuring node. Some examples of the second node are an LMU, an eNodeB, a wireless device, or a radio node performing positioning measurements in general.

Some examples of the first node are a network node (e.g., O&M, positioning node, SON node, eNodeB, a controlling or a gateway node, etc.) or test equipment or another wireless device.

The first node may obtain the second node's receiver RF type information e.g. by
  receiving the signaled information from the second node, e.g.,
    lower-layer signaling (e.g., dedicated or shared control channel, physical broadcast/multicast channel)
    higher-layer signaling (e.g., RRC, X2, LPP, LPPa, SLm-AP protocols)
    combination of the lower-layer signaling and higher-layer signaling
  discovering the configuration used by the second node autonomously,
  receiving via a third node (e.g., via a coordinating node, positioning node, O&M, SON node, etc.),
  acquiring the receiver RF type from a database or a computer-readable medium.

The second node's receiver RF type information may be received by the first node from another node upon a request from the first node or in unsolicited way, e.g., upon a triggering condition or event in the second node or periodically. Some examples of the triggering condition or event in the second node may be a change of receiver RF type (and thus associated with the conditions/events that may trigger the receiver RF type change—see solution 2), turning on the receiver after a period of inactivity, accessing the radio network or attaching to a cell, entering or leaving a pre-defined geographical (e.g., a building or a vehicle) or a logical area (e.g., a cell, tracking area, synchronization area, a local area, etc.), receiving a predefined message from another node, upon determining a certain environment or interference conditions (e.g., based on baseband or RF measurements).

The receiver RF type may be declarable by the second node, may be statically pre-configured in the second node or associated with the hardware, or may be semi-statically or dynamically configured (see, e.g., solution 2). In one specific example, the first node and the second node may be integrated one into another (e.g., LMU is integrated into eNodeB), may be sharing some equipment (e.g., a radio antenna), and/or may communicate over a proprietary interface. The receiver RF type of the second node may thus be obtained by the first node via cross-layer communication or over the proprietary interface.

The receiver RF type configured in the second node may be determined by, depend on, or be associated with one or more of conditions:

Multi-carrier support or configuration,

CA support or configuration (e.g., intra-band, inter-band, band combination for CA, bandwidth combination for CA, RAT combination for CA, etc.), RAT support (e.g. a specific RAT, single-RAT, multi-RAT, multi-mode support, multi-standard radio (MSR), etc.), Frequency, frequency range and frequency band support, as well as their combinations, including contiguous or non-contiguous operational spectrum, Network deployment type (e.g., homogeneous or heterogeneous deployments comprising deployments of one or several radio network node classes respectively; multi-antenna deployments, CoMP or deployments with/without DAS, RRHs, RRUs; deployments comprising radio network nodes of a certain type e.g. relays, HeNB, CSG HeNBs, repeaters, pico BS; etc.), Measuring node deployment type, e.g., whether measuring node is integrated with the node receiving physical radio signals for measurements via a radio interface, measuring node sharing radio equipment with the node receiving the physical radio signals, measuring node is connected to one or more radio nodes receiving the physical radio signals, measuring node is equipped with a receiving and/or transmitting antenna, measuring node is co-sited, co-located or with a certain distance with another radio network node, etc.

association (which may be static or dynamic) of the measuring node (LMU) with another radio node (e.g., eNodeB) or an area, e.g., the association may be requested or decided by another node or autonomously selected by the LMU or follow a pre-defined rule (e.g., based on the distance, radio propagation, pathloss, received signal strength or quality, etc.), the another node may be informed that the measuring node is now associated to the another node, the association may be decided by handshaking between the measuring node and the another node.

radio environment type (e.g., indoor/outdoor, urban/suburban/rural, with/without rich multipath), receiver type with respect to its ability to handle interference in a certain way or at certain interference level (e.g., interference suppression, interference cancellation, etc.), service type or measurement type.

Duplex mode or duplex configuration, e.g., FDD, TDD, half-duplex FDD, dynamic TDD, etc.

Power consumption and energy level (e.g., receiver power consumption class or profile in general or for a specific element e.g. DSP, power consumption constraints, remaining battery level, etc.)

Channel bandwidth or receiver RF bandwidth (available, required, supported, or configured, etc.)

The conditions above may also be used for adaptively configuring the receiver RF type (see more embodiments in solution 2).

Solution 2

Methods of Adapting the Receiver RF Type for Positioning

This solution may be a standalone embodiment or may be combined with other solutions described herein.

According to a basic embodiment in this part of the present disclosure, a measuring node (e.g., eNodeB, LMU, or a wireless device) adapts at least its receiver RF type (e.g., one or more of the RF configuration parameters—see e.g., the terminological definition at the end of this description) for performing positioning measurements.

The adaptation may be in a static, semi-static or dynamic manner. In some embodiments, the measuring node may also adapt its transmitter RF configuration, e.g., when the measuring node is also capable of transmitting radio signals and especially when it is capable of simultaneously receiving and transmitting radio signals. Some examples of positioning measurements are: TOA, TDOA, RTT, UL RTOA, RSTD, UE Rx-Tx, eNodeB Rx-Tx, Timing Advance, one-way propagation delay, etc., wherein the positioning measurements may be UL measurements, DL measurements, or both (e.g., RTT, UE Rx-Tx, eNodeB Rx-Tx, and Timing Advance have both DL and UL components).

The adaptation may be triggered in the measuring node in different ways, e.g., by one or more of:

a positioning or positioning measurement request received by the measuring node from another node (e.g., from a positioning node, O&M, SON, MDT, eNodeB, etc.), the received request may comprise an explicit request to adapt the RF receiver type (e.g., the measuring may be explicitly requested to adapt its receiver RF type; the request may also indicate a receiver RF type or a condition to be met by the receiver or a rule to be used for adapting the receiver RF type or a target value of the receiver RF metric; the second node may also indicate a failure to adapt its receiver RF type upon such a request) or an implicit request (e.g., upon received a positioning-associated request the measuring node may try to adapt its receiver RF type)

when the target RF performance is not met, the receiver node (a.k.a. measuring node) may also report a failure or any indication that a certain target RF performance is not met or cannot be met; the reason for this (e.g., software or hardware limitation or failure, memory limitation in general or for a certain component in the RF configuration chain, power or energy constraints, etc.) may also be indicated.

a triggering condition or event, e.g., any of the conditions listed above for solution 1, e.g., when the measuring node is requested to perform a measurement in a certain frequency or band or with a certain measurement configuration (e.g., CA or inter-RAT), the receiver RF type to be used for the measurement may be determined adaptively to this condition a timer and/or a counter are above or a below a certain level a radio measurement performed by the measuring node is checked versus a condition, the adaptation is triggered if the comparison gives a first result, and otherwise the adaptation is not triggered a certain interference condition has been determined by the measuring node or indicated to the measuring node, e.g., the interference estimate may be one or more of or may be derived from one or more of: baseband measurements and/or RF measurements a certain radio environment type has been determined by the measuring node (e.g., LMU may perform DL measurements for a cell or UL interference measurements to determine the proximity of a macro cell and/or a wireless device) or indicated to the measuring node recognition of the environment of a previously experienced environment (e.g., based on the historical data, cell ID, measurements, etc.), e.g., the previous adaptation result may be stored and reused upon recognizing the same or similar environment the second node performance is above or below a threshold (e.g., if the performance is above a threshold, then a more relaxed receiver RF type may be selected which may be less power and resource consuming; if the performance is below a threshold then a more demanding receiver RF type may be selected which may lead however to more consumed resources; see also solution 3)

RF performance falls below a first threshold (e.g., worse than acceptable) or exceeds a second threshold (e.g., too good and thus save resource saving may be considered) (see also solution 3), e.g., for an area, for one or more radio nodes, for one or more services or measurement types, over a period of time, etc.

Measurement performance (e.g., measurement quality, measurement time, measurement accuracy) is below or above a threshold, e.g., For one or more measurements, one or more wireless devices, one or more radio nodes in the area, over a period of time, etc.

Service performance (e.g., voice quality, connection quality, positioning result accuracy, etc.) is below or above a threshold, e.g., For an area, for one or more radio nodes, over a period of time, etc.

The adaptation of the receiver RF type may comprise, e.g., selecting a receiver RF type from a set of possible receiver RF types and configuring the receiver accordingly. The configured receiver may be then used for performing positioning measurements. The node may also signal the selected receiver RF type to another node (e.g., to positioning node, eNodeB, O&M, SON, a neighbor radio node, testing equipment, etc.—see, e.g., solution 1 for more examples).

The adaptation may be performed by the measuring node autonomously or with assistance from or interaction with another node.

The adaptation may be for one or more receivers (e.g., when a node has multiple receivers), for one or more specific services, for one or more specific measurements or measurement types, for a certain time period, for a certain frequency (carrier, CC, frequency band or its part, etc.), at certain time and/or frequency occasions (e.g., described by time/or frequency pattern).

There may be a certain minimum (e.g., pre-defined) time or transition time allowed between using the receiver with the old RF configuration and the adapted RF configuration.

Upon a change of the receiver RF configuration, there may be an event triggering another action in the radio node, e.g., Indicating to another node that the RF type has changed and/or storing such indication in a local database (e.g., with any one or more of additional information: a time stamp, one ore more measurements, reason, new configuration, etc.)

signaling the RF configuration information (and possibly also indication of the reason for change) to another node (e.g., positioning node, MDT, SON, O&M, eNodeB, etc.)

selecting or adapting the receiver algorithm for handling the interference (e.g., using interference cancellation or interference suppression or none of the two), acquiring (e.g., from a database or memory) and applying the acquired measurement configuration for performing one or more measurements, responsive to the RF type change restarting one or more measurements.

To facilitate measurement performance, the receiver may also receive a search window information (e.g., expected delay propagation and the delay uncertainty), e.g., in the UL positioning assistance data from E-SMLC or as assistance data from another network node. The search window may also be obtained autonomously by the measuring node. The search window (e.g., availability of this information in the assistance data, the search window configuration versus a reference search window configuration) may be accounted for by the measuring node when adapting the receiver RF type.

Other on-going measurement configuration parameters may also be accounted for by the measuring node when adapting the receiver RF type, e.g.; number of on-going or requested measurements, target quality of the performed or requested measurements (e.g., no target, i.e., best-effort, or a specific minimum accuracy target or maximum measurement time target).

Solution 3

Methods of Estimating the RF Performance for a Receiver Used for Positioning Measurements or Timing Measurements This solution may be a standalone embodiment or may be combined with other solutions described in previous sections.

According to a basic embodiment in this part of the present disclosure, the receiver RF performance is estimated for the receiver used for positioning measurements and/or timing measurements, where the estimation comprises obtaining an RF performance metric estimate, wherein the metric is adapted for positioning measurements and/or timing measurements.

Positioning measurements and timing measurements may be DL measurements, UL measurements, or both (e.g., some measurements may have both a DL component and an UL component such as RTT). A positioning or a timing measurement may also be a measurement performed by a wireless device based on radio signals transmitted by another wireless device.

Positioning measurement is any measurement which is configured for positioning and/or may be used for positioning even if being configured originally for one or more purposes which are not necessarily positioning. Some examples of the positioning measurements are: positioning timing measurements, power-based positioning measurements, AoA measurements.

Timing measurements may be performed for any purpose, including positioning, e.g., network management, RRM, radio resource optimization, proximity detection of a radio node, timing synchronization or timing aligning, distance or range estimation, MDT, SON, etc. Some examples of timing measurements are timing advance, RTT, one-way propagation delay, TOA, TDOA, RSTD, UL RTOA, UE Rx-Tx measurement, and eNodeB Rx-Tx measurement.

The RF performance metric estimate for a receiver may be obtained in different ways, e.g., based on one or more of:
  Acquiring of a pre-defined RF performance characterization for a specific receiver RF type
  Estimating/predicting based on historical data or collected performance statistics for other receivers in similar conditions
  Estimating based on historical data or collected performance statistics for the target receiver, e.g., in similar conditions and/or during a time period
  By mapping or applying a pre-defined rule using as input one or more radio conditions which are experienced by the receiver, e.g.,
    The conditions may be "discovered" by the node based on baseband or RF measurements (e.g., received signal strength, noise rise due to interference, received signal to noise ratio, total interference and noise, amount of co-channel interference, amount of in-band or out-of-band interference, etc.)
      In the prior art LMU does not perform UL noise rise or total interference and noise
    The conditions may be explicitly indicated by another node (e.g., the eNodeB to which LMU is associated or by positioning node)
  In one example, there may be a pre-defined rule for performing measurements used for obtaining RF performance metric and/or for obtaining reference RF performance metric value (e.g., used for relative comparison—see further below), e.g.,
    The measurements should be performed with a certain interval over a certain time
    The measurements should be performed over a certain time with request
    There may be a certain minimum (e.g., pre-defined) time or transition time allowed between using the receiver with the old RF configuration and the adapted RF configuration
    There may be a certain minimum (e.g., pre-defined) time allowed between obtaining two RF performance metric estimates (e.g., the receiver "resting time" may be two times of each or the longest RF performance metric estimation periods)
    There may be a certain minimum (e.g., pre-defined) time allowed between two consecutive measurements used for RF performance metric estimation (e.g., the receiver "resting time" or the time between two test runs may be two times of each or the longest measurement periods).
  Performing one or more of testing procedures for the receiver, e.g., in a lab, test bad, test network, or real network, e.g.,
    Verification may be versus a pre-defined or configured RF performance metric value(s)
    Calculated as a detection probability for a radio signal which may be used for the measurement (to ensure that the present signal is determined), e.g.,
      May be per UE, per measurement type, per service, per area, per environment, per RF configuration, per receiver or antenna port, over a time period, etc.
      Detection probability may further be a correct detection probability or erroneous detection probability (when the desired signal is present but another signal is determined instead). Hence, obtaining a detection probability may also comprise a verification of whether the determined signal is the correct signal (e.g., having the desired signal signature or sequence).
      There may also be a reference/target detection probability defined, e.g., 90% or 95%.
    Calculated as a false alarm rate or a probability of a false detection of a radio signal which may be used for the measurement (to ensure that no signal is determined when the signal is not present), e.g.,
      May be per UE, per measurement type, per area, per environment, per service, per RF configuration, per receiver or antenna port, over a time period, etc.
      There may also be a reference/target false alarm defined, e.g., 1e-6.
    Calculated as a statistical measure comprising one or more values, e.g., a standard deviation, median, mean, Xth percentile, CDF, PDF, a characteristic function, histogram
    Based on a correlation result for radio signals used for the measurements
    Based on a relative comparison (e.g., degradation or improvement) with respect to a reference performance, e.g.,
      the reference performance may be the performance in ideal or optimized conditions, performance with a reference RF configuration, performance at a reference time, performance in a reference condition (e.g., SNR or SINR at a certain level), performance prior an event (e.g., prior starting the measurement)

The estimated RF performance metric may be further used, e.g., for any one or more of:
  Evaluating versus a target value of the RF performance metric, wherein the target RF performance metric value may be e.g. pre-configured, dynamically configured according to a pre-defined rule, or received from another node; the evaluation result may be further used for any of the below,
  Selecting a receiver RF type or performing the receiver RF adaptation (see e.g. solution 2)
  Configuring one or more of positioning and/or timing measurements responsive to or adaptively the obtained RF performance estimate
  Storing in a database or as historical data, e.g., for obtaining RF performance estimate of this or other receivers; the storing may also be together with other additional information e.g. the corresponding radio conditions, interference characterization, location of the receiver, receiver RF type, time, etc.
  Signaling to another node (see e.g. solution 1 and solution2)
  Receiver power consumption or battery energy optimization,
    When the performance is higher than required (e.g., above a threshold), a less power consuming RF configuration may be selected when the battery energy is below a threshold, or
    When the performance is lower than required (e.g., below a threshold), more resources may be allocated, with or without changing the RF configuration, to achieve a better RF performance when the battery energy is above a threshold Comparing the measurement node's RF performance level with a reference performance level, where the reference performance level may be, e.g.,
  with another node in same situation to exclude internal malfunctioning (this could be valid for all methods), e.g.,
  Comparing the RF configurations associated with the two RF performance levels
  reference RF performance metric value
  RF performance of the same receiver or another receiver in reference (e.g., known or pre-defined) conditions
  RF performance of another receiver in the same conditions (e.g., to exclude internal malfunctioning, this could be valid for all methods, receiver solutions and implementations); an example of "another" receiver may be a receiver with a different RF architecture and/or different RF adaptation behavior.

The receiver may also adapt receiver RF type (see solutions 1, 2, 4 described herein) to meet a target RF performance level. In one embodiment, the adaptation may further comprise obtaining and using one or more of: an adaptive detection threshold, a target/reference detection threshold (may be pre-defined or determined based on a pre-defined rule, may be decided autonomously by the receiver, received from another node, obtained by mapping to a condition or acquired from a table or database), and a target/reference false alarm rate (may be pre-defined or determined based on a pre-defined rule, may be decided autonomously by the receiver, received from another node, obtained by mapping to a condition or acquired from a table or database).

In one embodiment, one RF performance metric (experience or the desired/target value) may be used to deduce the value of another RF performance metric. For example, a target/reference false alarm rate may be used to determine the target/reference detection probability or vice versa.

In another embodiment, a weighted function of one or more RF performance metrics may be determined to evaluate the RF performance.

The receiver may also receive a search window information (e.g., expected delay propagation and the delay uncertainty), e.g., in the UL positioning assistance data from E-SMLC or from another network node. The search window (e.g., availability of this information, the search window configuration versus a reference search window configuration) may be accounted for in estimating RF performance.

New Reference Channel

In yet another embodiment, a new reference channel is introduced to evaluate the RF performance. In one example the reference channel may be specified for a physical reference signal, e.g., SRS. Such reference channel currently is not specified in the standard.

The new reference channel may be characterized by one or more of the parameters: modulation, signal sequence, transmission/reception scheduling (comprising time and/or frequency resources), signal bandwidth (e.g., wide band, narrow band, part of a band comprising N resource blocks), frequency hopping configuration, C-RNTI associated with the cell serving the UE, a code or specific sequence associated with the wireless device from which the reference signal is obtained, duplex configuration, CA configuration (e.g., configuration of PCell and SCell(s), activation status of at least one serving cell), power control parameters (e.g., same or different than PUSCH or PUCCH power control, power control offset), EARFCN, UL cyclic prefix, UL system bandwidth of the cell, Cell-specific SRS bandwidth configuration srs-BandwidthConfig [36.211, v11.0.0], UE-specific SRS bandwidth configuration srs-Bandwidth [36.211, v11.0.0], number of antenna ports for SRS transmission srs-AntennaPort [36.211 v11.0.0], number of receiver antenna ports, SRS frequency domain position [36.211, v11.0.0], SRS frequency hopping bandwidth configuration [36.211, v11.0.0], SRS-Cyclic shift [36.211, v11.0.0], SRS transmission comb [36.211, v11.0.0], SRS configuration index [36.213, v10.7.0], MaxUpPt which used for TDD only [36.211, v.11.0.0], indication on whether the group-hopping-enabled [36.211, v11.0.0], deltaSS parameter [36.211, v11.0.0, 5.5.1.3] (included when SRS sequence hopping is used [36.211, v11.0.0, 5.5.1.4] and not included otherwise).

The reference channel configuration may also comprise simultaneous transmissions of the reference signal with other signals/channels/specific transmissions from the same transmitting node (e.g., PUSCH, PUCCH, CQI feedback, etc.).

Solution 4

Compliance to Requirements and Testing

Compliance to Pre-Defined Requirements.

According to some, a measuring node may adapt its receiver RF type to meet certain pre-defined requirements may adapt the transmitting node's configuration to meet certain pre-defined requirements and/or a network node (e.g., positioning node) may assist (e.g., ensure that the configurations comply with the nodes' capabilities) in adapting the receiver RF type to meet certain pre-defined requirements (e.g., reference RF performance or pre-defined RF performance level in certain conditions or in a certain radio environment). For the adapting, any one or a combination of the embodiments described for solutions 1-3 may also be used.

Compliance to Tests

The methods described in the present disclosure, e.g., the method of obtaining RF configuration information, methods of adapting receiver RF type and methods of meeting a pre-defined requirement (e.g., a certain RF performance level) may also be configured in the test equipment (TE) node (aka system simulator (SS) or test system (TS)). The TE or SS will have to implement all configuration methods related to embodiments applicable to different nodes e.g. wireless device, serving radio node, positioning node, measuring radio nodes (e.g., standalone LMU) in order to verify pre-defined requirements and procedures described in preceding sections.

The purpose of the test is to verify that the radio nodes, measuring node, wireless device, positioning node etc. are compliant to the pre-defined rules, protocols, signaling and requirements associated with obtaining and using RF configuration information and/or adapting the receiver RF type.

Typically the TE or SS or TS separately performs tests for UE and radio network nodes. There may also be separate tests for LMUs.

The testing may be measurement-specific and may be capability-dependent, e.g., LMU provides (declares) one or a set of supported bandwidths and/or their combinations. For example, requirements described in preceding section may be verified with such TE or SS.

For measuring node (e.g., LMU or eNodeB) testing, the TE or SS will also be capable of:

Receiving the measurement results from a measuring node,

Analyzing the received results e.g. comparing the measurement result or the statistics of the measurement results (e.g., with 90% confidence) obtained in the test with the reference results to determine whether measuring device is compliant to the requirements or not. The reference can be based on the pre-defined requirements or measuring node behavior or theoretical estimate or performed by a reference device. The reference device can be part of TE or SS.

Figure 4:
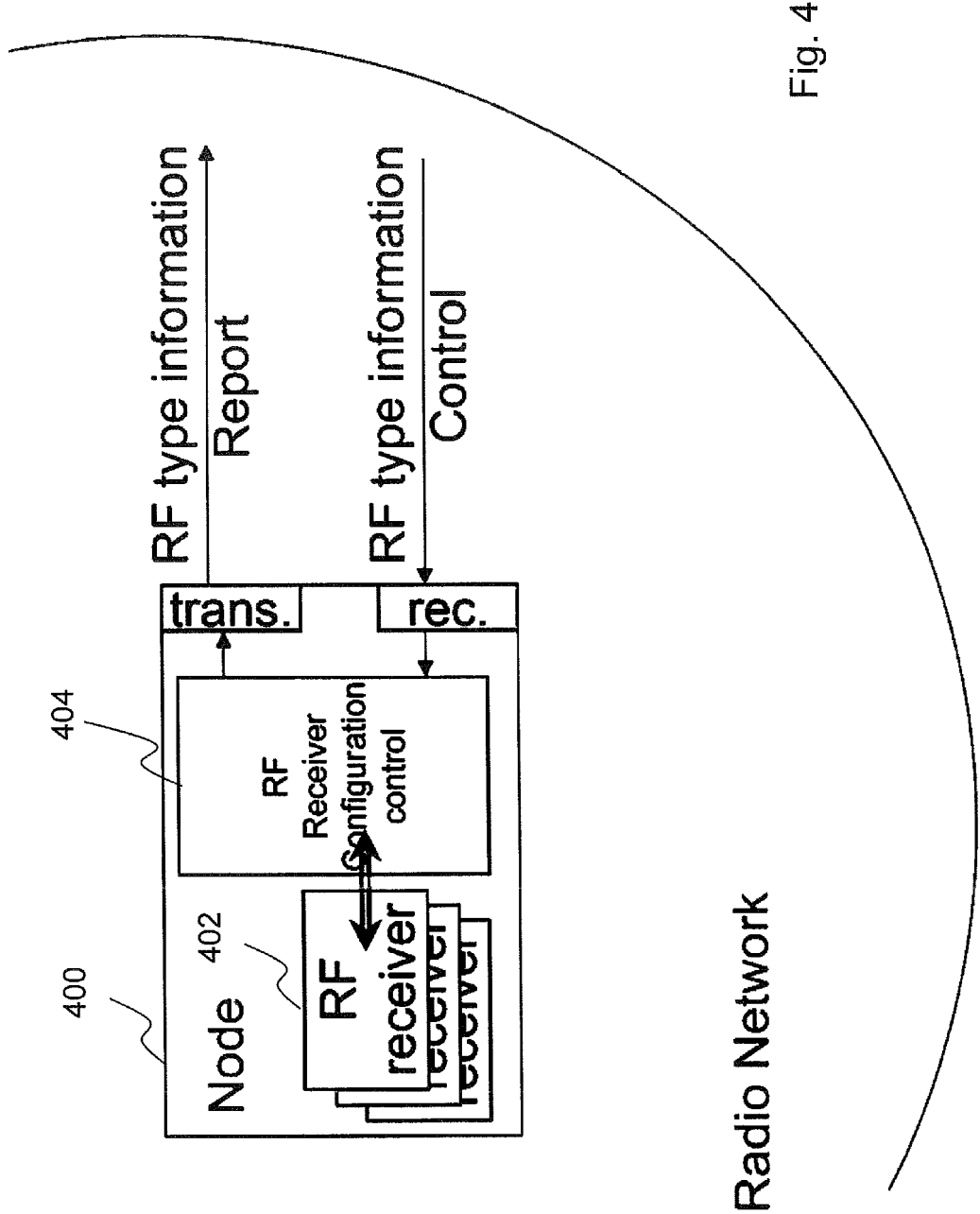
FIG. 4 illustrates an embodiment of a measuring node.

FIG. 4 provides an example node 400 of the radio network (e.g., of FIG. 1). The node 400 has one or more RF receivers 410. Each RF receiver 410 may be configured as shown in FIGS. 2 and 3 and may have an RF configuration. The node 400 has further an RF receiver configuration controller 420 that controls the RF receiver configuration. This can either be setting an RF configuration or setting RF characteristics to adhere to. Said controller 420 can report current RF configurations and RF characteristics by means of RF type information reports. The controller 420 may do so based on internal triggers, like an alarm raised by one of the RF receivers 410 that the RF receiver no longer adheres to the set characteristics. The controller 420 may also report based on a received request.

The controller 420 may also receive RF type information control. Said controller 420 may invoke or request this or such is received unsolicited. The controller 420 uses the received RF type information to control the RF characteristics of the RF receivers 410.

Figure 5:
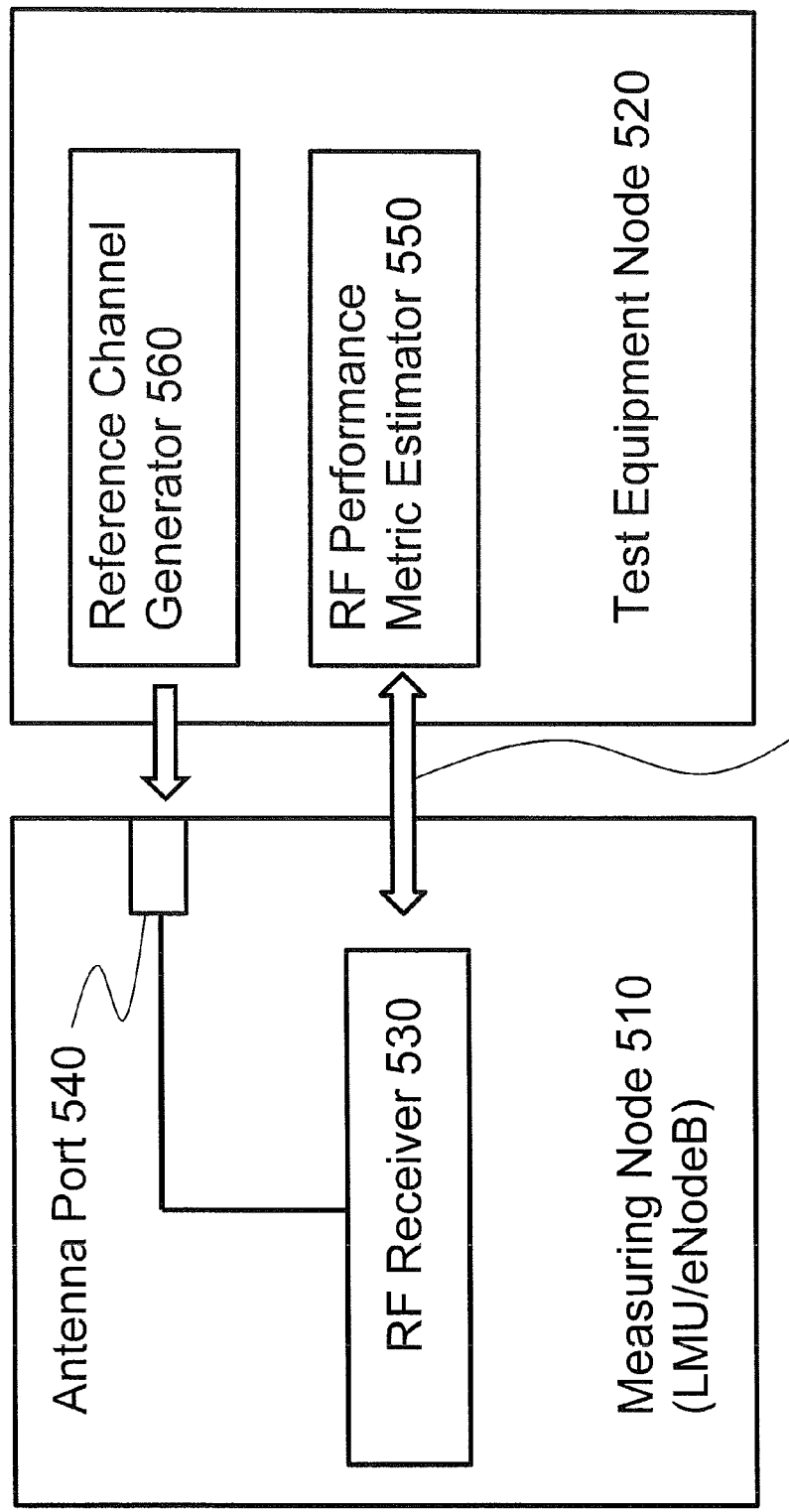
FIG. 5 illustrates a receiver performance management system according to an embodiment of the present disclosure.

FIG. 5 illustrates an embodiment of a receiver performance management system 500 comprising one or more measuring nodes 510 and one or more test equipment nodes 520.

The measuring node 510 may be realized as an LMU and may be deployed in a network environment as generally illustrated in FIG. 1. The measuring node 510 comprises an RF receiver 530 as well as an antenna port 540 coupled to the RF receiver 530. In some embodiments the measuring node 510 may comprise multiple RF receivers 530, wherein for each RF receiver 530 a dedicated antenna port 540 is provided. The measuring node 510 may in one implementation be realized as illustrated in FIG. 4 (i.e., may comprise the RF receiver configuration controller 504 for the processing of RF type information).

Each RF receiver 530 of the measuring node 510 may have a receiver configuration as shown in FIG. 2 or FIG. 3. In particular, the RF receiver 530 may comprise DSP (reference numeral 312 in FIG. 3) for receiving measurement requests and generating measurement reports.

The test equipment node 520 comprises an RF performance metric estimator 550. The estimator 550 is configured to send measurement requests to the RF receiver 530 and to receive corresponding measurement reports. Further, the RF performance metric estimator 550 is configured to calculate one or both of a detection probability and a false alarm rate for a radio signal sent to the RF receiver 530. The radio signal may be generated by a dedicated reference channel generator 560 coupled to the antenna port 540 of the measuring node 510. In the present embodiment the reference channel generator 560 is illustrated to be a part of the test equipment node 520. In other embodiments the reference channel generator 560 may be co-located with another node or may be realized in a node of its own.

Figure 6:
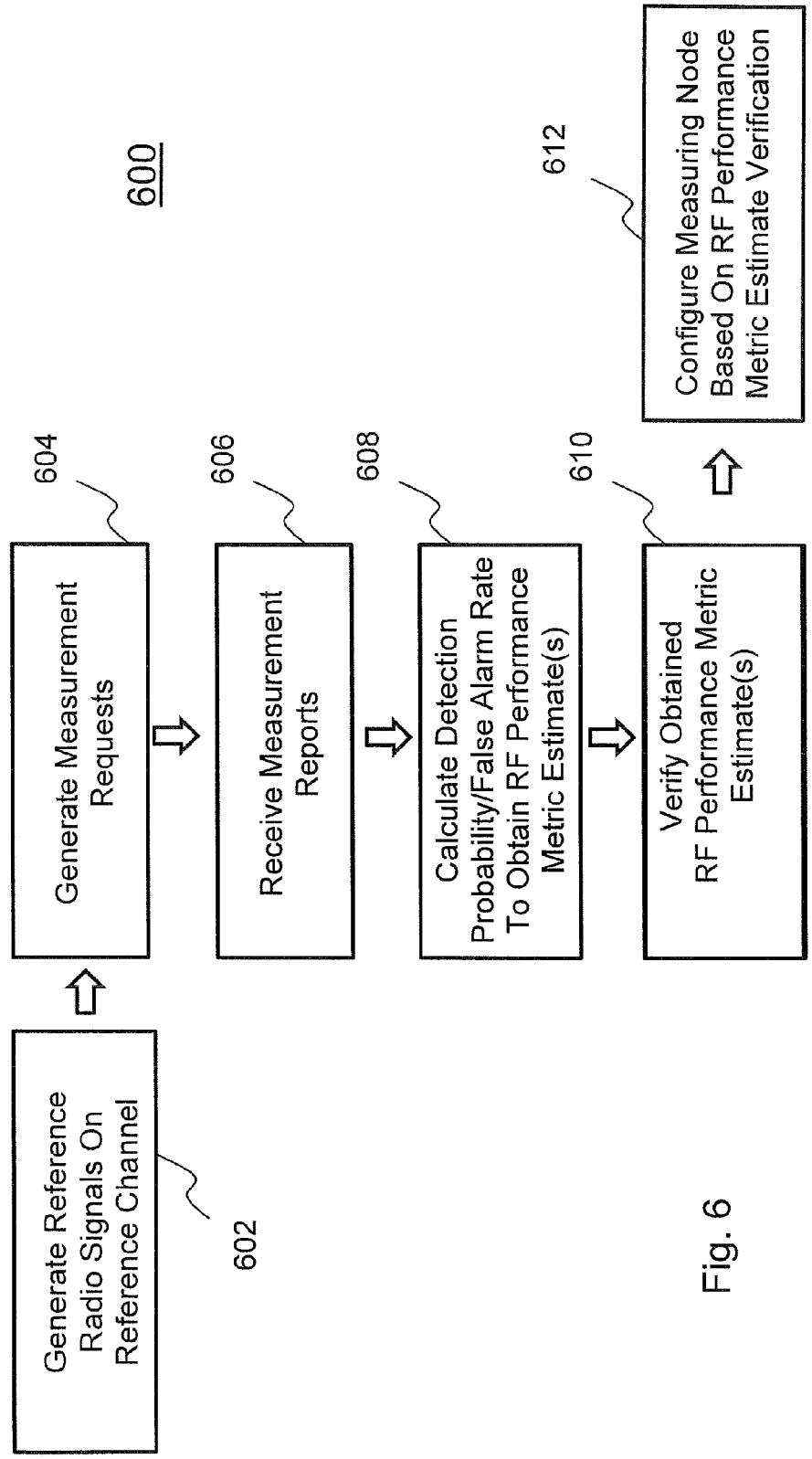
FIG. 6 illustrates a flow diagram of a method embodiment according to the present disclosure.

In the following the operation of the receiver performance management system 500 illustrated in FIG. 5 will be described in more detail with reference to the schematic flow diagram 600 of FIG. 6. Flow diagram 600 illustrates the steps of a method embodiment that are at least partially performed by the test equipment node 520.

As illustrated in FIG. 5, in a first step 602 a reference radio signal is generated by the reference channel generator 560 on a reference channel. The reference channel may have a configuration as discussed above with reference to solution 3. In an exemplary LTE/LMU implementation, the reference radio signal may comprise SRSs. This permits an efficient assessment of the LMUs with respect to LMU RTOA measurements, since LU RTOA measurements are performed on LMU SRS which do not carry any higher layer information and no data channels.

While generating and transmitting the reference signal to the RF receiver 530, the RF performance metric estimator 550 repeatedly generates measurement requests and communicates those requests to the RF receiver 530 (see step 604). Responsive to the measurement requests generated in step 604, the RF performance metric estimator 550 receives associated reference reports 606 from the RF receiver 530. It will be appreciated that steps 604 and 606 can be performed essentially concurrently.

In step 608 the RF performance metric estimator 550 analyses statistics with respect to the generated measurement requests and the received measurement reports to calculate RF performance metric estimates in the form of a detection probability and a false alarm rate. In the exemplary LTE/LMU implementation, using detection probability and false alarm rate as RF performance metric estimates on the basis of SRS detection is more appropriate for evaluating positioning/timing measurement performance than any throughput-related metric such as the maximum throughput for a specified reference measurement channel or BER.

The detection probability calculated in step 608 may be represented as the ratio of received measurement reports to the total number of measurement requests. In a similar manner, the false alarm rate may be calculated as the percentage of the received measurement reports to the total number of measurement requests with the measurement configuration of a signal which is not present.

In a further step 610, the resulting RF performance metric estimates (i.e., the detection probability) are verified versus one or more associated RF performance metric values. Those RF performance metric values may take the form of a detection probability requirement and a false alarm requirement, respectively (also referred to as reference results herein). As an example, the detection probability requirement may be 90%, 95% or 99%. The false alarm requirement may be 0.01% or 0.1%.

In an optional further step 612, the test equipment node 510 or an operator of the measuring node 510 may (re-)configure the measuring node 510 based on the RF performance metric estimate verification. Such a (re-)configuration may comprise changing a receiver RF characteristic, configuration or type as stated herein.

Figure 7:
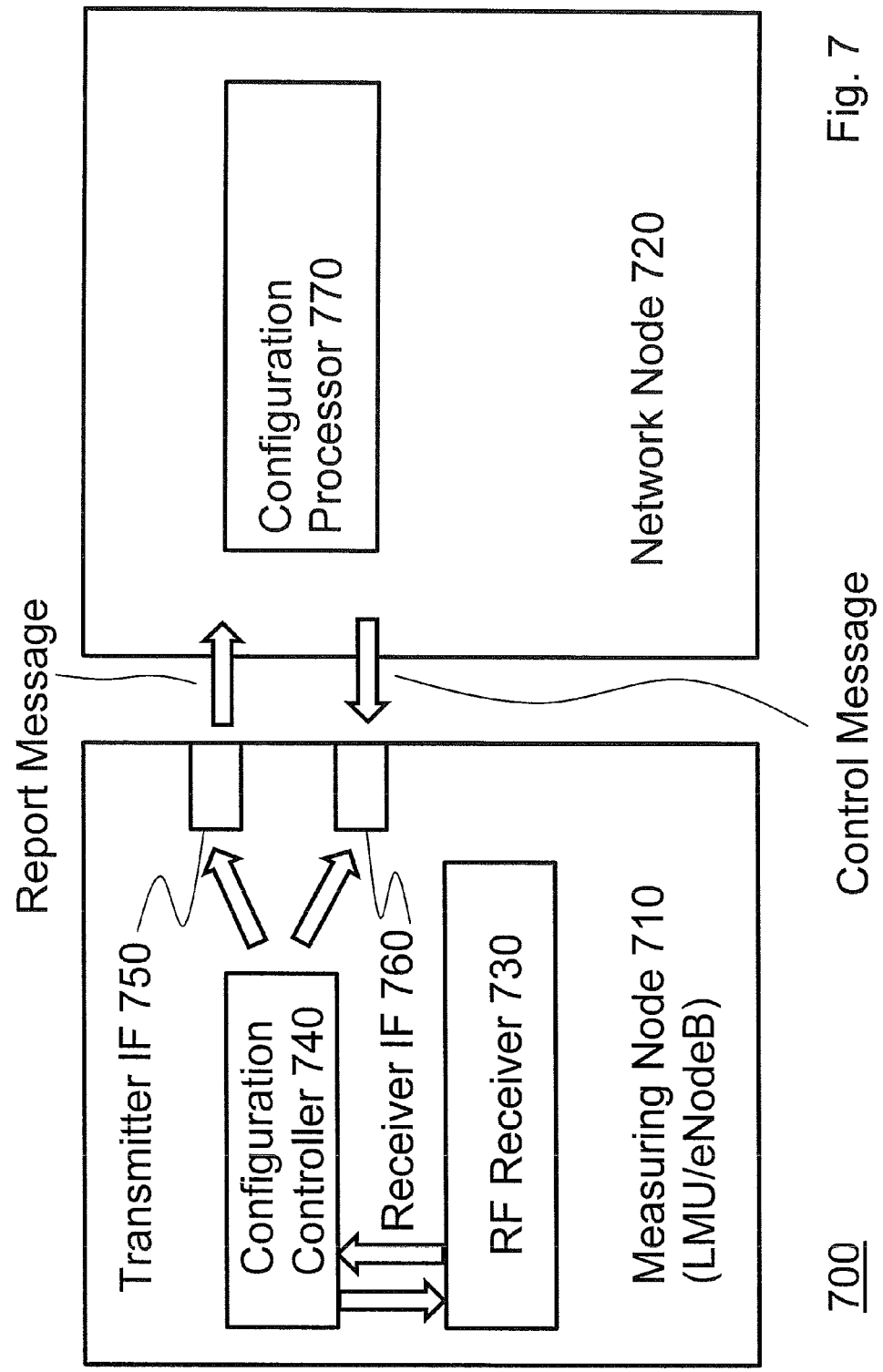
FIG. 7 illustrates a network node system for adapting RF receiver configurations in accordance with the present disclosure.

FIG. 7 illustrates an embodiment of a network node system 700 comprising one or more measuring nodes 710 and one or more further network nodes 720. The embodiment of FIG. 7 may realize, or may be combined, with any one of solutions 1, 2, 3 or 4 described above.

The one or more measuring nodes 710 may, for example, be configured as LMUs or eNodeBs. The at least one further network node 720 may be realized in the form of a core network node. Alternatively, the at least one network node

720 may be realized in the form of an LMU or eNodeB. In the latter case, the at least two network nodes 710, 720 may be peers (e.g., may be located on the same hierarchical and/or functional level of the network node system 700).

The measuring node 710 may in one example take the form of the example node 400 illustrated in FIG. 4. Moreover, the network node system 700 could be configured to realize at least a portion of the receiver performance management system 500 illustrated in FIG. 5. As an example, the measuring node 710, and, optionally, the network node 720 of FIG. 7, may each implement the functionalities of the measuring node 510 of FIG. 5.

As shown in FIG. 7, the measuring node 710 comprises an RF receiver 730 as well as a configuration controller 740. Those two components may in some cases correspond to the RF receiver 402 and the RF receiver configuration controller 404 of FIG. 4. The measuring node 710 further comprises a transmitter interface 750 as well as a receiver interface 760. The transmitter interface 750 is configured to transmit report messages generated by the configuration controller 740 to the network node 720. In turn, the receiver interface 760 is configured to receive control messages from the network node 720 and forward same to the configuration controller 740.

The configuration controller 740 is coupled to the RF receiver 730 in order to adapt the current RF receiver configuration of the RF receiver 730 based on the control information received from the network node 720. Moreover, the configuration controller 740 is configured to determine a current RF receiver configuration (with one or more current RF characteristics) of the RF receiver 730. Additionally, or as an alternative, the configuration controller 740 is configured to determine possible RF configurations (with a range of one or more possible RF characteristics) with respect to the RF receiver 730. The range of one or more possible RF characteristics could be a continuous range or could be indicated in the form of one or more discrete values.

The network node 720 of FIG. 7 comprises a configuration processor 770. The configuration processor 770 is configured to analyze report information contained in the report messages received from the measuring node 710. Further, the configuration processor 770 is configured to generate control information to be transmitted via the control messages to the measuring node 710. The generation of the control information may be based on an analysis of the reported information received from the measuring node 710.

In the following the operation of the network node system 700 illustrated in FIG. 7 will be described in more detail with reference to the schematic flow diagram 800 of FIG. 8. Flow diagram 800 illustrates the steps of a method embodiment jointly performed by the measuring node 710 and the further network node 720.

Figure 8:
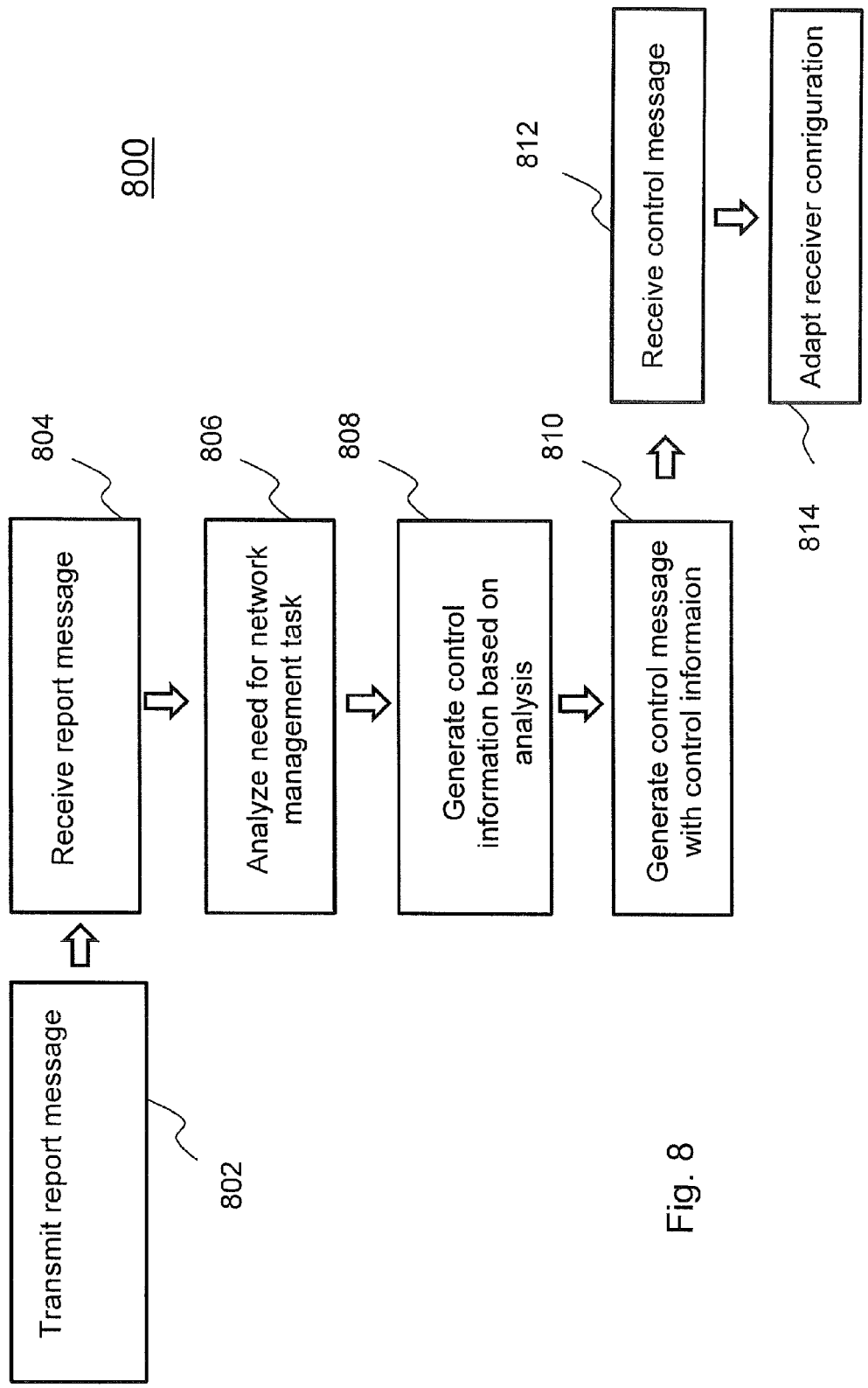
FIG. 8 illustrates a flow diagram of a further method embodiment according to the present disclosure.

As illustrated in FIG. 8, in a first step 802 the configuration controller 740 generates a report message and transmit same to the network node 720. The report message includes report information pertaining to the current RF receiver configuration of the RF receiver 730. In other embodiments, the report information is indicative of possible RF receiver configurations of the RF receiver 730 (e.g., indicated via a range of one or more possible RF characteristics). The RF characteristics pertaining to the RF receiver 730 may generally comprise one or more of a receiver sensitivity, a receiver dynamic range, a receiver in-band selectivity, a receiver adjacent channel sensitivity, a receiver blocking (as in-band or out-of band), a narrow band blocking characteristic, receiver spurious emissions, and a receiver intermodulation characteristic.

The report message may be transmitted in step 802 unsolicited or upon a dedicated request. The request may be received via the receiver interface 760 from the network node 720. When the network node 720 and the measuring node 710 are realized as peers, the configuration controller 740 may interpret a report message received from the network node 720 as a request to transmit itself a report message to the network node 720.

In step 804 the report message transmitted by the measuring node 710 is received by the network node 720. As said, the report message may be received unsolicited or in response to a request previously transmitted by the network node 720 to the measuring node 710.

Then, in step 806 the configuration processor 770 of the network node 720 analyzes the report information contained in the report message. This analysis pertains to an identification of a need for executing a network management task. Such a network management task, may for example, require the configuration of one or more radio measurements (e.g., timing and/or positioning measurements) by the measuring node 710. In another embodiment, the network management task may be indicative of a selection or re-selection of a positioning method.

In another step 808 control information is generated by the configuration processor 770 responsive to the results of the analysis in step 806. The control information generated in step 806 generally relates to a control of the current RF receiver configuration of the measuring node 710. As an example, the control information may control the current RF receiver configuration by specifying an RF receiver configuration to be set (including maintaining the current RF receiver configuration). In another example, the control information may control the current RF receiver configuration by specifying one or more performance targets for one or more RF characteristics of the current RF receiver configuration.

In a further step 810 a control message is generated by the configuration processor 770. The control message is generated to include the control information generated in step 808. Then, also in step 810, the generated control message is transmitted to the measuring node 710.

In step 812 the control message is received by the measuring node 710 via the receiver interface 760. In a further step 814, the configuration controller 740 analyzes the control information received in the control message and adapts the RF receiver configuration of the RF receiver 730 accordingly. Such an adaptation may include setting the current RF receiver configuration of the RF receiver 730 in accordance with an RF receiver configuration specified by the control information, or in accordance with one or more specified performance targets. Such an adaptation may also take into account one or both of an interference estimate and a noise estimate derived (e.g., by the configuration controller 740) for the RF receiver 730.

Based on the adapted RF receiver configuration, the measuring node 710 may perform one or multiple measurements, in particular positioning and/or timing measurements, via the RF receiver 730. Those measurements may be reported in a measurement report to another network node such as a network node 720 of FIG. 7. It will be appreciated that the network node 720 may communicate with multiple measuring nodes 710 in connection with adapting their RF receiver configuration and may thus also be receiving measurements reports from multiple such measurement nodes 710.

As has become apparent from the above description of some embodiments, the technique presented herein permits a control of radio performance. Specifically, the technique permits a remote adaptation of RF receiver configurations using, for example, targets (including thresholds or rules) for one or more RF characteristics. If those cannot be met, another RF receiver configuration can automatically (e.g., autonomously) be implemented. If no suitable RF receiver configuration is available, or in other cases, this may be indicated via the report messaging described herein. In response to such report messaging, an RF receiver configuration may be set using control messaging. The corresponding reporting could also be implemented already as a "pre-warning" before specific targets, thresholds or rules are trespassed.

In the Present Description the Following Terminology is Used

Wireless device, mobile device and UE are used interchangeably in the description. A UE may comprise any device equipped with a radio interface and capable of at least generating and transmitting a radio signal to a radio network node. Note that even some radio network nodes, e.g., femto BS (aka home BS), LMU, eNodeB, relay, etc., may also be equipped with a UE-like interface. Some example of "UE" that are to be understood in a general sense are PDA, laptop, mobile, sensor, fixed relay, mobile relay, any radio network node equipped with a UE-like interface (e.g., small RBS, eNodeB, femto BS).

A radio node is characterized by its ability to transmit and/or receive radio signals and it comprises a transmitting and/or receiving antenna. A transmitting radio node has at least a transmitting antenna, whilst a receiving radio node has at least a receiving antenna. In some special examples, a radio node may not have an own antenna but may share one or more antennas with another node. A radio node may be a UE or a radio network node. Some examples of radio nodes are a radio base station (e.g., eNodeB in LTE or NodeB in UTRAN), a relay, a mobile relay, remote radio unit (RRU), remote radio head (RRH), a sensor, a beacon device, a measurement unit (e.g., LMUs), user terminal, PDA, mobile, iPhone, laptop, etc.

A radio network node is a radio node comprised in a radio communications network and typically characterized by an own or associated network address. For example, amobile equipment in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g., an example dual-mode user equipment may operate with any one or combination of WiFi and LTE or HSPA and LTE/LTE-A). A radio network node, including eNodeB, RRH, RRU, or transmitting-only/receiving-only nodes, may or may not create own cell and may comprise in some examples a transmitter and/or a receiver and/or one or more transmit antennas or one and/or more receive antennas. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells).

A measuring node is a radio node (e.g., wireless device or radio network node) capable of performing measurements on one or more of: DL radio signals, UL radio signals, and signals received from a wireless device. The radio signals may be received via an own antenna and/or an antenna shared with one or more other nodes. In some examples, the received physical radio signals may be amplified prior performing a radio measurement. Depending on the embodiments, the measuring node may perform measurements on one or more of: DL signals (e.g., a wireless device or a radio network node equipped with a UE-like interface, LMU, relay, etc.), UL signals (e.g., a radio network node in general, relay, eNodeB, WLAN access point, LMU, etc.), and signals from a wireless device. The measuring node may have also one or more interfaces (e.g., radio interface, fixed interface, IP interface) for communicating with other nodes, e.g., for reporting measurements and/or for receiving measurement requests or measurement configuration data. The measuring node may also be equipped with a radio interface used for timing synchronization, e.g., GNSS interface and/or radio interface for synchronizing using synchronization or pilot signals. The measuring node may also receive System Information (SI) from the radio network which may be used for measurement configuration and/or timing synchronization, e.g., the system information may be received via dedicated signaling or multicast/broadcast signaling; the signaling may be via radio channels (e.g., MIB, SIB1, SIBS, physical control channels, etc.) or high-layer sign aling. The RF components of the measuring node may be comprised in hardware and/or software. In some examples, a measuring node may comprise a software-defined radio system where one or more of the components that have been typically implemented in hardware (e.g. mixers, filters, amplifiers, modulators/demodulators, detectors, etc.) are implemented by means of software. Some example receiver architectures that may be comprised in the measuring node are shown in FIGS. 2 and 3.

The receivers 200, 300 illustrated in FIGS. 2 and 3 may be provided in any measuring node such as the LMUs of FIG. 1. In other words, the corresponding receivers may be configured for performing at least one of a positioning measurement and a timing measurement.

A network node may be any radio network node or core network node. Some non-limiting examples of a network node are an eNodeB, RNC, positioning node, MME, PSAP, SON node, MDT node, (typically but not necessarily) coordinating node, and O&M node.

A positioning node as described in different embodiments is a node with positioning functionality. For example, for LTE it may be understood as a positioning platform in the user plane (e.g., SLP in LTE) or a positioning node in the control plane (e.g., E-SMLC in LTE). SLP may also consist of or comprise SLC and SPC, where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node" used herein is a network and/or node, which coordinates radio resources with one or more radio nodes. Some examples of the coordinating node are network monitoring and configuration node, OSS node, O&M, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described herein is either via direct links or logical links (e.g., via higher layer protocols and/or via one or more network and/or radio nodes). For example, signaling from a coordinating node may pass another network node, e.g., a radio network node.

The embodiments, including the solutions, presented herein are not limited to LTE, but may apply with any Radio Access Network (RAN), single- or multi-RAT. Some other RAT examples are LTE-Advanced, UMTS, HSPA, GSM, cdma2000, WiMAX, and WiFi.

Measurements herein may comprise measurements performed on any one or more of: UL radio signals, DL radio signals, radio signals received from a wireless device. Hence, the measurements may comprise DL measurements, UL measurements, measurements on radio signals received from a wireless device, or any combination thereof, e.g., measurements comprising both DL and UL components (e.g., RTT or Rx-TX measurements). Some example measurements are in TS 36.214, v11.0.0 or TS 25.215, v11.0.0. The measurements may be performed in the baseband (e.g., RSRP/RSRQ, timing measurements, UL received signal quality, and AoA) or in the RF part (e.g., noise rise, received interference power, received energy, received power spectral density, total received interference and noise). In some examples, the measurements may even need to be done in relation between different radio chains.

Herein, the following terms may be used interchangeably: UL measurements used for positioning, measurements used for UL positioning, and UL positioning measurements, and comprise any radio measurement which may be performed on radio signals configured for positioning or other purpose and wherein the measurements are used at least for positioning. The term UL positioning at least in some embodiments may refer, e.g., to UTDOA. Further, UL positioning measurements may comprise, e.g., UL RTOA, but may also be any of the following: UL TOA, UL TDOA, UL AoA, UL power-based measurement (e.g., UL received signal quality or UL received signal strength measurement or received interference power), UL propagation delay, or even a two-directional measurement involving an UL measurement component (e.g., RTT, eNodeB Rx-Tx or UE Rx-Tx) or any measurement in general involving at least one UL measurement component (e.g., such as a measurement on multifarious links or a composite measurement). When a measurement involves two links (e.g., TDOA, a measurement over multifarious links, RTT, etc.), the links may be between two or more nodes and/or locations (e.g., three nodes may be involved with multifarious links or TDOA, comprising two receivers or two transmitters). The term "node" herein may comprise any radio node as described above.

An UL transmission or an UL radio signal is in general any radio signal transmission by the wireless device, wherein the transmission may be a dedicated or directed towards a specific node (e.g., eNodeB, LMU, another wireless device, relay, repeater, etc.) transmission or a multicast or a broadcast transmission transmitted by the wireless device. In some examples, an UL transmission may even be a peer-to-peer transmission, when the transmission is by the wireless device being positioned. Some examples of UL radio signals measured for UL positioning measurements are refers ence signals transmitted by the wireless device (e.g., SRS or demodulation reference signals transmitted in UL), dedicated or shared channels transmitted by the wireless device (e.g., data channels, control channels, random access channel, a broadcast channel transmitted by the wireless device, etc.), or other physical signals (e.g., transmitted by the wireless device to support device-to-device communication such as for neighbor discovery or presence/activity indication or transmitting a beacon signal/message).

The term receiver RF characteristic may comprise, e.g., one or more of receiver sensitivity, receiver dynamic range, receiver in-channel selectivity, receiver adjacent channel selectivity, receiver blocking as in band or out of band, narrow-band blocking characteristic, receiver spurious emissions, receiver intermodulation characteristic, or more generally a receiver RF configuration or a set of receiver configuration parameters that characterize the receiver RF performance or the receiver ability to meet one or more pre-defined RF requirements. A receiver configured with a certain RF configuration or having one or more of certain RF characteristics is also referred herein to as a receiver RF type. An RF configuration may be associated with one or more of RF characteristics. An RF configuration may also comprise a chain of RF components or modules, which may be configured statically, semi-statically or dynamically (e.g., some chain may comprise a subset of components or modules that may be used by the node). Some examples of RF configuration parameters comprise sampling rate and jitter, dynamic range, thresholds associated with RF characteristics, filter type or filter configuration parameter, LNA configuration, center frequency of local oscillators, ADC bandwidth, RF bandwidth, and integration time for measurements. One or more of pre-defined sets of RF parameter combinations associated with different receiver RF types may also be stored in a database (e.g., filter bank, etc.). Some receiver RF configurations may also differ by: location of ADC (e.g., baseband, IF, or RF), analog front-end bandwidth and ADC bandwidth (e.g., single or multiple channels, frequency slice, service band e.g. GSM, frequency band or range e.g. 2 GHz band; narrow band or wideband), memory configuration (e.g., memory size, memory type, etc.), and power consumption. Some non-limiting examples of receiver architectures: multimode direct-conversion receiver, multimode low IF receiver, multi-mode IF-sampling receiver, wideband IF sampling architecture, wideband direct-conversion/low-IF architecture, direct-sampling architecture.

In some embodiments, a receiver RF configuration or receiver RF type may also comprise a transceiver RF configuration or even a transmitter RF configuration (e.g., when the transmitter RF has an impact on the receiver RF performance of the same node). Thus, e.g., in the embodiments describing adaptation of the receiver RF type (e.g., solution 1 and/or solution 2), the adaptation may also comprise adaptation of the transceiver RF configuration or adaptation of the transmitter RF configuration.

In some embodiments, the RF configuration may comprise either the current configuration or the node's capability to support a certain one or more of RF configurations. In some examples, the RF configurations may also be pre-defined (e.g., by the standard) or configurable.

It is believed that many advantages of the technique disclosed herein will be fully understood from the foregoing description, and it will be apparent that various changes may be made in the form, construction, and arrangement of the exemplary embodiments without departing from the scope of the invention, or without sacrificing all of these advantages. Since the technique presented herein can be varied in many ways, it will be recognized that the invention should be limited only by the scope of the claims appended hereto.

ABBREVIATIONS

3GPP 3rd Generation Partnership Project
ADC Analog-to-Digital Conversion
AoA Angle of Arrival AP Access Point
BS Base Station
CA Carrier Aggregation
CC Component Carrier
CDF Cumulative Distribution Function
CoMP Coordinated Multipoint Transmission
C-RNTI Cell RNTI
CRS Cell-specific Reference Signal
CPICH Common Pilot Channel
CQI Channel Quality Indicator
CSG Closed Subscriber Group
DAS Distributed Antenna System
DL Downlink
DSP Digital Signal Processor
eNodeB evolved Node B
E-SMLC Evolved SMLC
E-UTRAN evolved UTRAN
GNNS Global Navigation Satellite System
GSM Global System for Mobile Communication
HASP High Speed Packet Access
HeNB Home eNodeB
IE Information Element
LCS Location Service
LNA Low Noise Amplifier
LPP LTE Positioning Protocol
LTE Long-Term Evolution
LMU Location Measurement Unit
MDT Minimization of Drive Tests
MIB Master Information Block
MME Mobility Management Entity
OSS Operational Support System
PCell Parameterized Cell
PCI Physical Cell Identity
PDA Personal Digital Assistant
PDF Probability Density Function
PSAP Public Safety Answering Point
PUScH Physical Uplink Shared Channel
PUCCH Physical Uplink Control Channel
RAT Radio Access Technology
RBS Radio Base Station
RF Radio Frequency
RNC Radio Network Controller
RNTI Radio Network Temporary Identity
RRC Radio Resource Control
RRH Remote Radio Head
RRU Remote Radio Unit
RSRP Reference Signal Received Power
RSRQ Reference Signal Received Quality
RSSI Received Signal Strength Indicator
RSTD Reference Signal Time Difference
RTOA Relative TOA
RTT Round Trip Time
SCell Secondary Cell
SIB System Information Block
SINR Signal-to-Interference Ratio
SNR Signal-to-Noise Ratio
SLP UPL Location Platform
SMLC Serving Mobile Location Center
SON Self-Optimized Network
SRS Sounding Refence Signals
SUPL Secure User Plane
TOA Time of Arrival
UE User Equipment
UL Uplink
UMTS Universal Mobile Telecommunications System
UTDOA UL Time Difference of Arrival
UTRA UMTS Terrestrial Radio Access
UTRAN UMTS Terrestrial Radio Access Network
WLAN Wireless Local Area Network

The invention claimed is:

1. A radio network node having at least one Radio Frequency (RF) receiver for receiving signals according to a wireless communication standard, the radio network node comprising:
   a transmitter interface configured to transmit to a network node a report message comprising report information, wherein the report information pertains to a current RF receiver configuration with one or more current RF characteristics or possible RF receiver configurations with a range of one or more possible RF characteristics;
   a receiver interface configured to receive from the network node, and responsive to the report message, a control message comprising control information, wherein the control information pertains to a control of the current RF receiver configuration; and
   a configuration controller configured to interactively adapt the RF receiver configuration based on the control information received from the network node.

2. The radio network node of claim 1, wherein the radio network node is configured to provide the report information upon a request and/or to issue a request asking for the control information.

3. The radio network node of claim 1, wherein the control information controls the current RF receiver configuration by specifying an RF receiver configuration to be set or one or more performance targets for the one or more RF characteristics of the current RF receiver configuration.

4. The radio network node of claim 1, wherein the radio network node is a measuring node.

5. The radio network node of claim 4, wherein the measuring node is configured to perform radio measurements, using the adapted RF receiver capabilities, based on signals transmitted by a wireless device.

6. The radio network node of claim 4, wherein the measuring node is configured for at least one of positioning and timing measurements.

7. The radio network node of claim 1, wherein the report message configures one or more radio measurements to be performed by another network node.

8. The radio network node of claim 1, wherein the radio network node is further configured to select one or more other radio network nodes for performing radio measurements.

9. The radio network node of claim 1, wherein the control information pertains to a RF receiver configuration of another radio network node.

10. The radio network node of claim 9, wherein the radio network node adaptively configures its radio equipment to the RF receiver configuration of the other radio network node.

11. The radio network node of claim 1, wherein the report information requests, indicates or adapts one or more of:
   a need of configuring or re-configuring radio equipment of another radio network node;
   a desired RF performance target;
   a receiver RF type of the other radio network node; and
   a configuration of the other radio network node to meet certain pre-defined requirements.

12. The radio network node of claim 1, wherein the radio network node is a test equipment node or a system simulator, or attachable to a test equipment node or a system simulator.

13. The radio network node of claim 1, wherein the RF characteristics comprise one or more of receiver sensitivity, a receiver dynamic range, a receiver in-band selectivity, a receiver adjacent channel sensitivity, a receiver blocking as in-band or out-of-band, a narrow band blocking characteristic, receiver spurious emissions, and a receiver intermodulation characteristic.

14. The radio network node of claim 1, wherein the configuration controller is further configured to adapt the RF receiver configuration also based on at least one of interference estimation and noise estimation at the at least one RF receiver.

15. A network node for controlling interactive adaptation of a Radio Frequency (RF) receiver configuration of a further network node, the network node configured to:
receive a report message comprising report information, wherein the report information pertains to a current RF receiver configuration with one or more current RF characteristics or possible RF configurations with a range of one or more possible RF characteristics regarding the further network node; and
transmit, responsive to the report message, a control message comprising control information, wherein the control information pertains to a control of the current RF receiver configuration of the further network node.

16. The network node of claim 15, further configured to:
receive a measurement report from the further network node, wherein the measurement report comprises one or more radio measurements performed by the further network node with an RF receiver configuration that has been adapted based on the control information.

17. The network node of claim 15, wherein the control information pertains to a network management task.

18. The network node of claim 17, wherein the network management task pertains to the configuration of one or more radio measurements by the further network node.

19. The network node of claim 18, wherein the one or more radio measurements pertain to at least one of positioning and timing measurements.

20. The network node of claim 17, wherein the network management task pertains to selecting one or more further network nodes for performing radio measurements.

21. The network node of claim 17, wherein the network management task pertains to one or more of selecting or re-selecting a positioning method, radio resource management, mobility, interference coordination, performance testing and verification, collecting performance statistics, requesting or indicating the need of radio equipment re-configuration for the further network node, indicating a desired RF performance target for the further network node, and ordering the further network node to perform an additional measurement or to re-do one or more measurements with a certain receiver RF type.

22. A network system comprising:
a radio network node having at least one Radio Frequency (RF) receiver for receiving signals according to a wireless communication standard, the radio network node comprising:
a transmitter interface configured to transmit to a network node a report message comprising report information, wherein the report information pertains to a current RF receiver configuration with one or more current RF characteristics or possible RF receiver configurations with a range of one or more possible RF characteristics;
a receiver interface configured to receive from the network node, and responsive to the report message, a control message comprising control information, wherein the control information pertains to a control of the current RF receiver configuration; and
a configuration controller configured to interactively adapt the RF receiver configuration based on the control information received from the network node; and
the network node configured to:
receive the report message; and
transmit, responsive to the report message, the control message.

23. A method of operating a radio network node having at least one Radio Frequency (RF) receiver for receiving signals according to a wireless communication standard, the method comprising:
transmitting to a network node a report message comprising report information, wherein the report information pertains to a current RF receiver configuration with one or more current RF characteristics or possible RF configurations with a range of one or more possible RF characteristics;
receiving, from the network node and responsive to the report message, a control message comprising control information, wherein the control information pertains to a control of the current RF receiver configuration; and
interactively adapting the RF receiver configuration based on the control information received from the network node.

24. A method of operating a network node for controlling interactive adaptation of a Radio Frequency (RF) receiver configuration of a further network node, the method comprising: receiving, from the further network node, a report message comprising report information, wherein the report information pertains to a current RF receiver configuration with one or more current RF characteristics or possible RF configurations with a range of one or more possible RF characteristics regarding the further network node; and transmitting, from the network node and responsive to the report message, a control message comprising control information, wherein the control information pertains to a control of the current RF receiver configuration of the further network node.

25. A non-transitory computer readable medium comprising a computer program comprising program code portions that, when executed by a processing circuit of a radio network node having at least one Radio Frequency (RF) receiver for receiving signals according to a wireless communication standard, configure the radio network node to:
transmit to a network node a report message comprising report information, wherein the report information pertains to a current RF receiver configuration with one or more current RF characteristics or possible RF configurations with a range of one or more possible RF characteristics;
receive, from the network node and responsive to the report message, a control message comprising control information, wherein the control information pertains to a control of the current RF receiver configuration; and
interactively adapt the RF receiver configuration based on the control information received from the network node.

* * * * *

UNITED STATES PATENT AND TRADEMARK OFFICE
CERTIFICATE OF CORRECTION

PATENT NO. : 9,439,166 B2
APPLICATION NO. : 14/431856
DATED : September 6, 2016
INVENTOR(S) : Siomina et al.

It is certified that error appears in the above-identified patent and that said Letters Patent is hereby corrected as shown below:

In the Drawings

In Fig. 2, Sheet 2 of 8, delete " 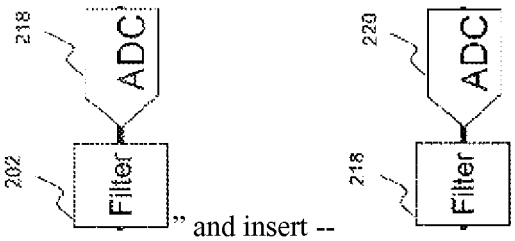 " and insert -- -- , therefor.

In the Specification

In Column 3, Line 10, delete "in-band band" and insert -- in-band --, therefor.

In Column 8, Line 22, delete "FIGS. 2 and 3" and insert -- FIGS. 2 and 3. --, therefor.

In Column 8, Line 30, delete "a another" and insert -- an another --, therefor.

In Column 9, Lines 37-38, delete "measurement There" and insert -- measurement. There --, therefor.

In Column 11, Line 15, delete "selection/re-selection" and insert -- selection/reselection --, therefor.

In Column 13, Line 46, delete "node." and insert -- node, --, therefor.

In Column 16, Line 7, delete "one ore more" and insert -- one or more --, therefor.

In Column 25, Line 42, delete "amobile" and insert -- a mobile --, therefor.

In Column 26, Line 21, delete "SIBS," and insert -- SIB8, --, therefor.

Signed and Sealed this
Thirtieth Day of May, 2017

Michelle K. Lee
*Director of the United States Patent and Trademark Office*

CERTIFICATE OF CORRECTION (continued)
U.S. Pat. No. 9,439,166 B2

In Column 26, Line 22, delete "sign aling." and insert -- signaling. --, therefor.

In Column 27, Line 59, delete "refers ence" and insert -- reference --, therefor.

In Column 29, Line 18, delete "GNNS" and insert -- GNSS --, therefor.

In Column 29, Line 37, delete "PUScH" and insert -- PUSCH --, therefor.

In Column 29, Line 55, delete "Ratio" and insert -- plus-noise Ratio --, therefor.

In Column 29, Line 57, delete "SLP UPL" and insert -- SLP SUPL --, therefor.

In Column 29, Line 60, delete "Refence" and insert -- Reference --, therefor.